(12) United States Patent
Hori

(10) Patent No.: US 8,237,921 B2
(45) Date of Patent: Aug. 7, 2012

(54) OPTICAL TIME DOMAIN REFLECTOMETER AND METHOD FOR TESTING OPTICAL FIBER USING OPTICAL PULSE

(75) Inventor: Shigeo Hori, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 1190 days.

(21) Appl. No.: 11/991,373

(22) PCT Filed: Jun. 20, 2007

(86) PCT No.: PCT/JP2007/062403
§ 371 (c)(1),
(2), (4) Date: Mar. 3, 2008

(87) PCT Pub. No.: WO2008/004443
PCT Pub. Date: Jan. 10, 2008

(65) Prior Publication Data
US 2010/0271622 A1 Oct. 28, 2010

(30) Foreign Application Priority Data
Jul. 3, 2006 (JP) ................................. 2006-183488

(51) Int. Cl.
*G01N 21/00* (2006.01)
(52) U.S. Cl. ...................................... 356/73.1
(58) Field of Classification Search .................. None
See application file for complete search history.

(56) References Cited

U.S. PATENT DOCUMENTS

| 4,812,038 A * | 3/1989 | Nazarathy et al. ........... 356/73.1 |
| 4,893,006 A | 1/1990 | Wakai et al. |
| 5,408,310 A * | 4/1995 | Furuhashi et al. ........... 356/73.1 |
| 5,870,184 A | 2/1999 | Furuhashi |
| 5,933,227 A * | 8/1999 | Furuhashi ..................... 356/73.1 |

(Continued)

FOREIGN PATENT DOCUMENTS

JP 63-163139 A 7/1988
(Continued)

OTHER PUBLICATIONS

K. Okada et al; Backscattering Measurement and Fault Location in Optical Fibers, The Transactions of the IECE of Japan vol. E63, No. 2, pp. 145-146, Feb. 1980.

(Continued)

*Primary Examiner* — Hwa Lee
*Assistant Examiner* — Gordon Stock, Jr.
(74) *Attorney, Agent, or Firm* — Holtz, Holtz, Goodman & Chick, PC

(57) ABSTRACT

At the time of real-time measurement, when a measurement position is specified by a marker, a marker level acquiring section acquires a waveform level from waveform data stored in a waveform memory. A level comparing section determines whether the waveform level acquired by the marker level acquiring section falls within an effective measurement level range preset correspondingly with attenuator (ATT) values. When the level comparing section determines that the waveform level does not fall within the effective measurement level range, an ATT value change section changes the ATT values into new ATT values at which a waveform level falls within the corresponding effective measurement level range. A control section allows a measured optical fiber to be measured based on the new ATT value, so as to enable waveform measurement with a good S/N ratio of not less than a predetermined value based on a measurement waveform displayed on a screen of a display section.

16 Claims, 13 Drawing Sheets

U.S. PATENT DOCUMENTS

| | | | |
|---|---|---|---|
| 5,963,313 A * | 10/1999 | Anderson | 356/73.1 |
| 6,445,445 B1 * | 9/2002 | Nakayama et al. | 356/73.1 |
| 6,611,322 B1 * | 8/2003 | Nakayama et al. | 356/73.1 |
| 7,016,024 B2 * | 3/2006 | Bridge et al. | 356/73.1 |
| 2008/0086278 A1 * | 4/2008 | Nakayama et al. | 702/84 |

FOREIGN PATENT DOCUMENTS

| | | |
|---|---|---|
| JP | 2-1527 A | 1/1990 |
| JP | 04-158237 A | 6/1992 |
| JP | 10-111212 A | 4/1998 |

OTHER PUBLICATIONS

International Preliminary Report on Patentability and Written Opinion of the International Searching Authority dated Jan. 15, 2009, issued in connection with International Application Serial No. PCT/JP2007/062403.

* cited by examiner

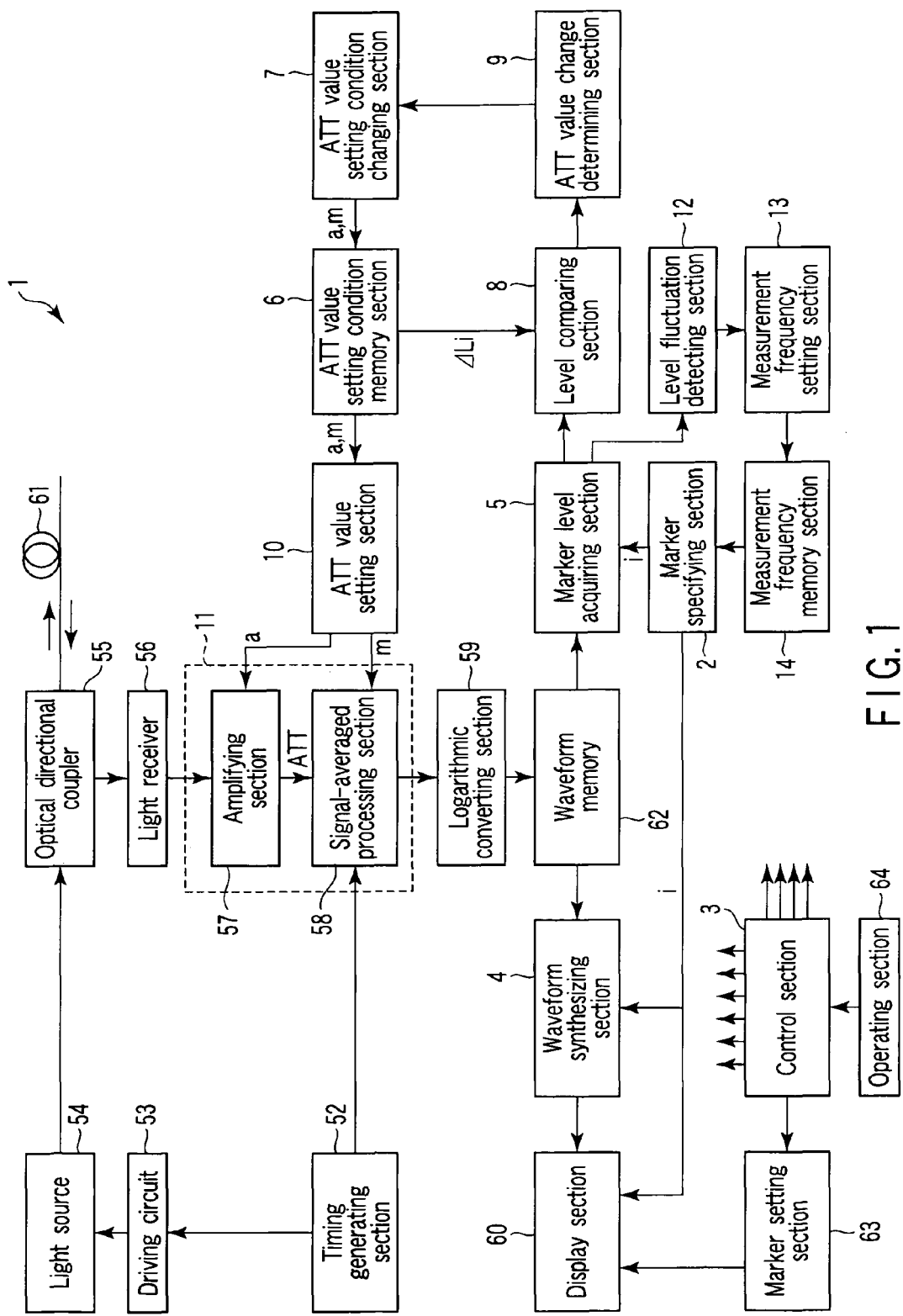
F I G. 1

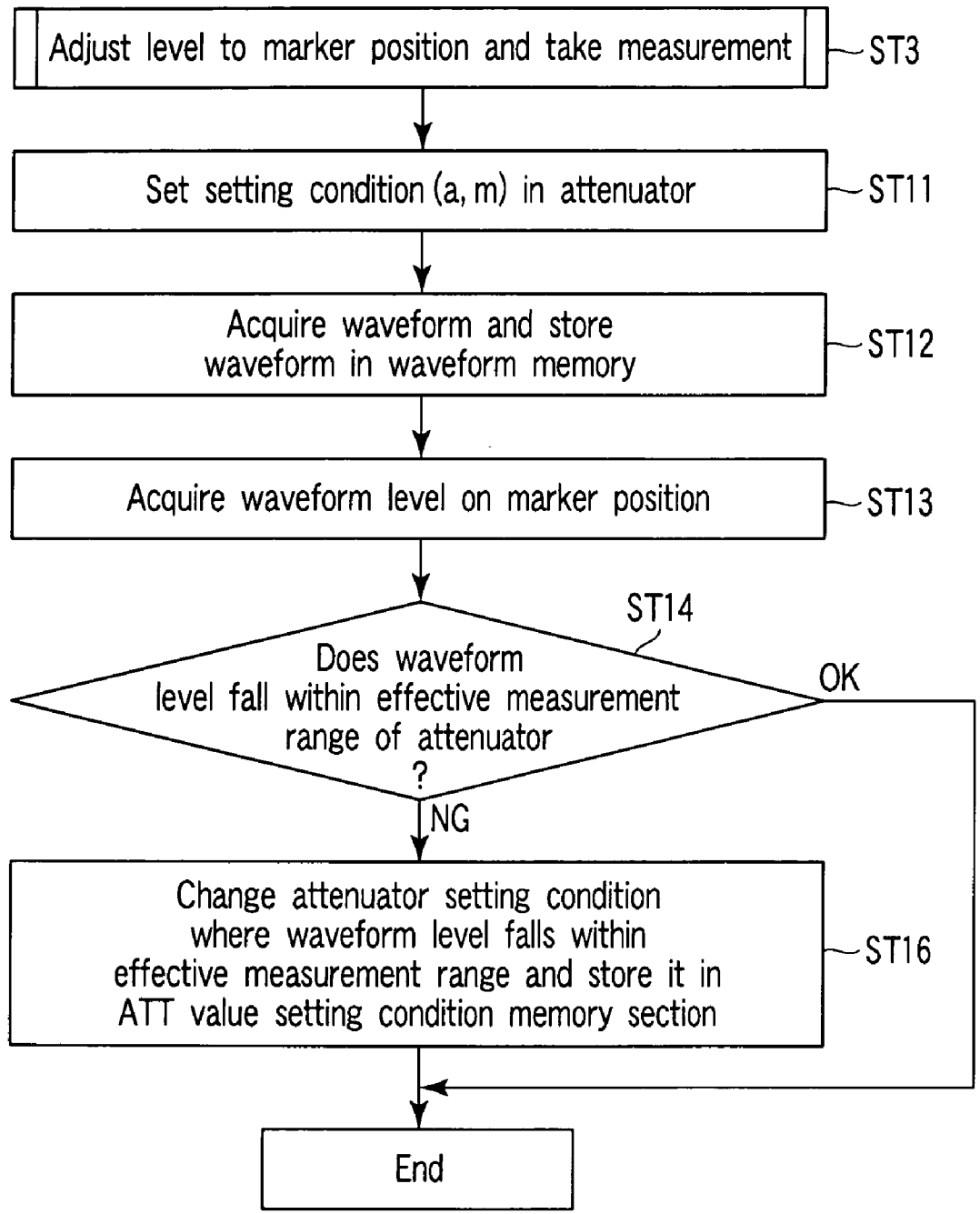
F I G. 3

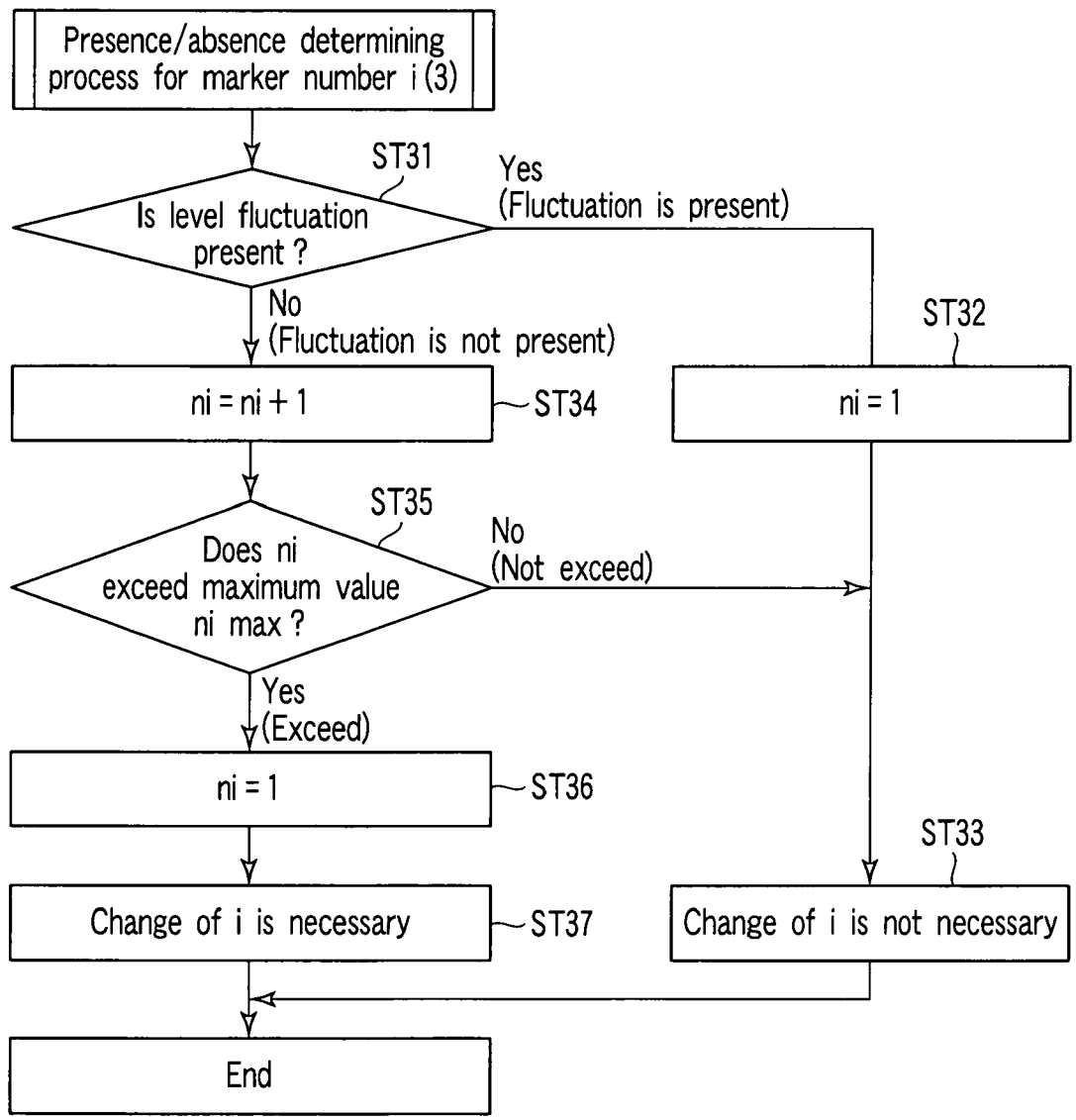
F I G. 4C

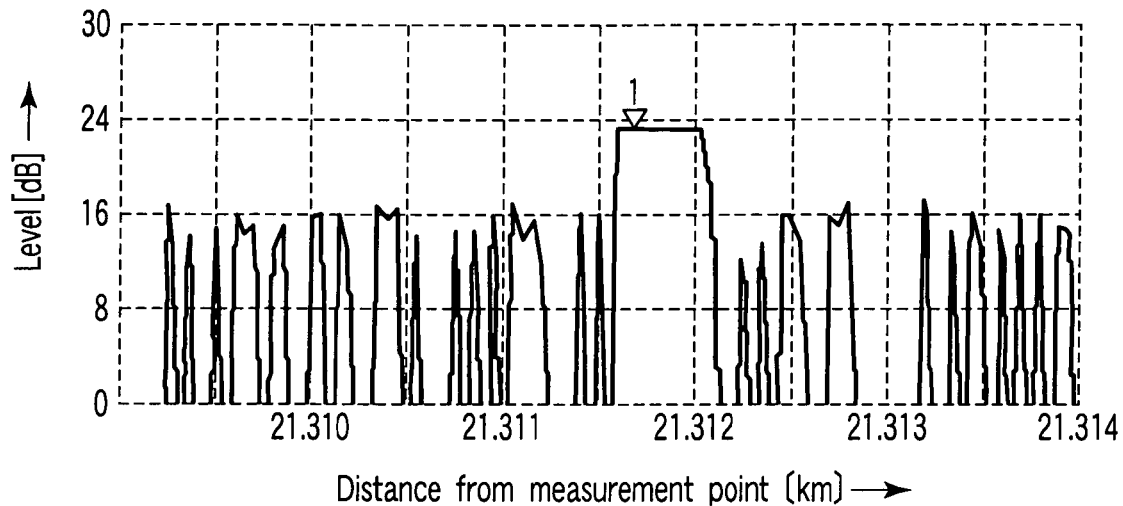
F I G. 5A
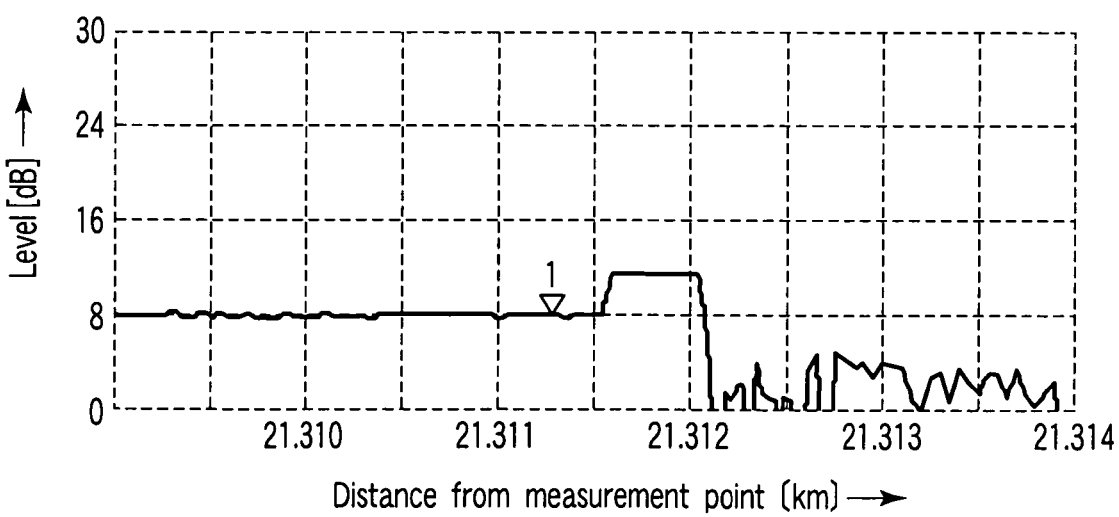
F I G. 5B 6 (ATT value setting condition memory section)

| Marker i | Amplifying gain a | The number of adding times m | Effective measurement level range $\Delta Li$ dBm |
|---|---|---|---|
| 1 | 200 | $2^8$ | $-25 \sim -45$ |
| 2 | 100 | $2^8$ | $-10 \sim -30$ |
| 3 | 300 | $2^8$ | $-40 \sim -60$ |
| 4 | 400 | $2^8$ | $-55 \sim -75$ |
| 5 | 300 | $2^8$ | $-40 \sim -60$ |
| 6 | 500 | $2^{10}$ | $-70 \sim -90$ |

14 (Measurement frequency memory section)

| Marker i | Measurement frequency Nimax |
|---|---|
| 1 | 2 |
| 2 | 5 |
| 3 | 1 |
| 4 | 2 |
| 5 | 5 |
| 6 | 1 |

FIG. 8

OPTICAL TIME DOMAIN REFLECTOMETER AND METHOD FOR TESTING OPTICAL FIBER USING OPTICAL PULSE

This application is a U.S. National Phase Application under 35 USC 371 of International Application PCT/JP2007/062403 filed Jun. 20, 2007.

TECHNICAL FIELD

The present invention relates to an optical time domain reflectometer and a method for testing optical fiber using an optical pulse, and particularly to an optical time domain reflectometer (OTDR) as an optical pulse tester which allows an optical pulse to be incident on a measured optical fiber, detects a fault point position of the measured optical fiber based on a detection result of reflected light returned from the measured optical fiber according to the incidence of the optical pulse, and measures a transmission loss property and a connection loss property of the measured optical fiber, and a method for testing an optical fiber using an optical pulse.

BACKGROUND ART

Optical time domain reflectometers (OTDR) as optical pulse testers emit optical pulse to be incident on a measured optical fiber, detect reflected light returned from the measured optical fiber according to the incidence of the optical pulse, so as to detect a fault point position of the measured optical fiber based on a detection result of the reflected light, and measure a transmission loss property and a connection loss property of the measured optical fiber.

FIG. 9 is a block diagram illustrating a constitution of the optical pulse tester disclosed in the following Patent Document 1 as one example of a conventional optical time domain reflectometer (OTDR) as an optical pulse tester which is conventionally known in general.

An optical pulse tester (OTDR) 49 shown in FIG. 9 is composed of a timing generating section 52, a driving circuit 53, a light source 54, an optical directional coupler 55, a light receiver 56, an amplifying section 57, a signal-averaged processing section 58, a logarithmic converting section 59, and a display section 60.

This kind of optical pulse tester (OTDR) 49 generates a pulse current in the driving circuit 53 based on an electric pulse from the timing generating section 52 so as to allow the light source 54 to emit light.

An optical pulse output from the light source 54 passes through the optical directional coupler 55, and is incident on a measured optical fiber 61 to be tested.

Return light such as backscattered light or reflected light from the measured optical fiber 61 is transmitted from the optical directional coupler 55 to the light receiver 56.

The light receiver 56 converts the return light such as the backscattered light or the reflected light from the measured optical fiber 61, which is transmitted from the optical directional coupler 55 to the light receiver 56, into an electric signal.

The electric signal output from the light receiver 56 is amplified by the amplifying section 57.

The signal-averaged processing section 58 converts the analog electric signal amplified by the amplifying section 57 into a digital signal by means of a built-in analog/digital (A/D) converter, and adds the signals a predetermined number of times so as to average them.

An averaged output from the signal-averaged processing section 58 is logarithmically converted by the logarithmic converting section 59, and the logarithmically converted result is displayed normally as a downward-sloping measurement waveform on the display section 60.

In this kind of optical pulse tester (OTDR) 49, basically, two kinds of measuring methods, i.e., averaging measurement and real-time measurement are known.

The averaging measurement is for adding measurement waveforms repeatedly a predetermined number of times for a relatively long time from several seconds to several tens of seconds and averaging them so as to acquire a measurement waveform with excellent signal-to-noise ratio (S/N ratio).

In the averaging measurement, like the optical pulse tester (OTDR) 49 disclosed in Patent Document 1, while a gain of the amplifying section 57 and the number of adding times (the average number of times) in the signal-averaged processing section 58 are suitably switched, the measurement is taken on portions of the measurement waveform with unsatisfactory S/N ratio, and only portions of the measurement waveforms with excellent S/N ratio are jointed so that a region with excellent S/N ratio of not less than a predetermined value which can be used for observation in a wide range can be acquired.

In this case, the optical pulse tester (OTDR) 49 shown in FIG. 9 further includes an S/N ratio comparing section 50 and a data memory section 51 in addition to the above constitution.

Data on the measurement waveform portions with excellent S/N ratio of not less than the predetermined value are directly stored in the data memory section 51 based on the comparison result of the S/N ratio comparing section 50.

Then, while the gain of the amplifying section 57 and the number of adding times (the average number of times) in the signal-averaged processing section 58 are suitably switched, the measurement is taken on the measurement waveform portions with an unsatisfactory S/N ratio of not more than the predetermined value based on the comparison result of the S/N ratio comparing section 50. As a result, data of measurement waveform portions with excellent S/N ratio improved to not less than the predetermined value are sequentially stored in the data memory section 51.

As a result, only the data of the measurement waveform portions with excellent S/N ratio of not less than the predetermined value stored in the data memory section 51 are jointed and displayed on the display section 60, so that an area with excellent S/N ratio of not less than the predetermined value which can be used for observation can be acquired over a wide range.

This can be regarded also as that since the gain of the amplifying section 57 cannot be continuously changed, when a specified combination of hard setting including the gain and a frequency property of the amplifying section 57 and the number of adding times (the average number of times) in the signal-averaged processing section 58 is normally expressed by an attenuator value, plural sets of the attenuator values are expressed by attenuation quantity in units of dB, and thus the attenuator value which becomes optimum according to the S/N ratio of the measurement waveforms is set suitably.

Therefore, it can be regarded also as that the amplifying section 57 and the signal-averaged processing section 58 compose an attenuator which is equivalent to an optical signal before converted into an electric signal.

In the case where the averaging measurement is taken, in the equivalent attenuator composed of the amplifying section 57 and the signal-averaged processing section 58, while the specified attenuator value obtained by the plural combinations of the hard setting including the gains and the frequency property of the amplifying section 57 and the average number of adding times in the signal-averaged processing section 58 is suitably changed according to the S/N ratio of the measurement waveform, the measurement is taken. As a result, solely the measurement waveform portions with an excellent S/N ratio of not less than the predetermined value can be jointed.

Contrary to the averaging measurement, in which a measurement is taken while the attenuator value is suitably changed, real-time measurement is suitable for adding measurement waveforms for a comparatively short time from 0.1 sec to about 1 sec and averaging them with the attenuator value being fixed, and the measurement result is sequentially updated to be displayed so as to observe a condition and a change of the optical fiber at that time.

For this reason, real-time measurement is widely used for applications requiring speed, as in the case where while an optical fiber is being connected by connector connection and fusion, a good/bad condition of the connection of the optical fiber needs to be checked while laying the optical fiber.

The backscattered light which returns from the measured optical fiber 61 to be measured is caused by Rayleight scattering generated in the optical fiber 61.

The level of the backscattered light becomes lower than the level of the incident pulse light by about 50 dB when the measured optical fiber 61 is a normal single-mode optical fiber and the width of an optical pulse incident on the measured optical fiber is $1 \times 10^{-6}$ seconds.

Therefore, in order to process such a very small signal, the optical pulse tester (OTDR) 49 needs to improve the S/N ratio by using digital averaging for repeatedly taking measurements a predetermined number of times, and adding and averaging the measurement results.

The signal-averaged processing section 58 of the optical pulse tester (OTDR) 49 shown in FIG. 9 uses such digital averaging so as to improve the S/N ratio.

In the case where digital averaging is used, when a quantization bit of the A/D converter incorporated in the signal-averaged processing section 58 is 8, a relationship shown in FIG. 10 holds between the number of averaging times and the S/N ratio.

In FIG. 10, for example, when the number of averaging times is $10^0$ and the S/N ratio is $-30$ dB, the S/N ratio becomes 10 dB at the time when the average is $10^2$ times, and this means that the S/N ratio is improved by 20 dB.

A technique for improving the S/N ratio using such digital averaging is described also in the following Non-Patent Document 1.

FIG. 11 is a diagram illustrating a measurement waveform when reflection attenuation whose level difference in the measurement waveform is large is measured by averaging measurement using the conventional optical pulse tester (OTDR) 49 shown in FIG. 9.

That is to say, as shown in FIG. 11, in the case where the reflection attenuation whose level difference in the measurement waveform is large is measured by averaging measurement, more time is taken so that the number of times for adding (the average number of times) the measurement waveform can be sufficiently increased. For this reason, the waveform level just before Fresnel reflection on the position of a marker 1 and the level of an apex of the Fresnel reflection on the position of a marker 2 can be observed simultaneously, and thus the reflection attenuation can be measured based on a difference therebetween.

The measurement of the reflection attenuation is taken when an operator, other than the operator of the optical pulse tester (OTDR) 49, fuses end surfaces of the optical fibers to be connected at a laying site of the optical fibers in a remote place distant from the measurement end by 20 Km or more.

Since it takes a certain amount of time to measure the reflection attenuation in the averaging measurement, when it is clear that the measurement result of the reflection attenuation deviates from an acceptable range, frequently the fusing operator performs the fusing operation for a subsequent optical fiber, and thus the measurement and the fusion cannot take place simultaneously.

On the other hand, in real-time measurement using an optical pulse tester (OTDR) 49, since it does not take much time to measure the reflection attenuation, the problem that the measurement and the fusion cannot take place simultaneously can be avoided.

In real-time measurement, the number of times for adding (the average number of times) the measurement waveforms is smaller than that in averaging measurement, and the measurement is taken with the attenuator value fixed. As a result, the area which is suitable for the observation of the waveforms with excellent S/N ratio in the acquired measurement waveforms becomes narrow.

For this reason, in the conventional optical pulse tester (OTDR) 49 shown in FIG. 9, in the real-time measurement, in the case where the waveform level to be measured greatly fluctuates in the acquired measurement waveform and another distance condition is tried to be observed, the waveform level of the distance to which the operator pays attention easily deviates from a suitable measurement area.

Further, in the conventional optical pulse tester (OTDR) 49 shown in FIG. 9, in the real-time measurement, in the case where a loss value between two points in the acquired measurement waveform is desired to be known and the reflection attenuation calculated based on the loss value between the two points is desired to be measured, the attenuator value cannot be set so that the waveform levels of the two points are simultaneously included in the area suitable for the measurement at the time when the waveform level difference between the two points is large.

Therefore, in the conventional optical pulse tester (OTDR) 49 shown in FIG. 9, it is very difficult to take satisfactory real-time measurement including the measurement of the reflection attenuation under such a circumstance.

FIGS. 12 and 13 are diagrams illustrating the measurement waveforms when the real-time measurement is taken by using the conventional optical pulse tester (OTDR) 49 shown in FIG. 9.

As shown in FIG. 12, in the case where the reflection attenuation in which the level difference is large is measured by the real-time measurement, when the attenuator values are selected so that the waveform level of an apex of the Fresnel reflection on the position of the marker 2 can be measured, the S/N ratio of the waveform level just before the Fresnel reflection on the position of the marker 1 is deteriorated and the waveform cannot be seen.

As shown in FIG. 13, the reflection attenuation where the level difference is large is measured by the real-time measurement. In this case, when the attenuator values are selected according to the waveform level just before the Fresnel reflection on the position of the marker 1, the waveform level of the apex of the Fresnel reflection on the position of the marker 2 is saturated so that accurate measurement cannot be taken.

Therefore, in the real-time measurement shown in FIGS. 12 and 13, in any case, it is difficult to accurately measure the reflection attenuation.

Further, the real-time measurement is taken for applications requiring the readiness with respect to the change in the measured optical fiber state.

In the case where the state of the measured optical fiber which is supposed to be measured and the measured optical fiber which is supposed to be measured is changed into another optical fiber with a certain optical fiber being measured, the attenuator values should be changed manually by the operator in order to adjust a measurement range.

On the other hand, in the real-time measurement, it is desired that the waveform on a desired position can be observed with an excellent S/N ratio of not less than the predetermined value merely by moving the marker as measurement position specifying means to be displayed on the display section 60 to a target position.

For example, in the real-time measurement, the marker (not shown) is moved to a portion of a measurement waveform with an unsatisfactory S/N ratio of not more than the predetermined value on the display section 60, and the attenuator values are changed into an optimum value automatically according to the S/N ratio on the marker position so that the measurement is taken. As a result, it is desired that the S/N ratio is improved on the marker position and a measurement waveform with excellent S/N ratio of not less than the predetermined value can be observed automatically.

In the conventional optical pulse tester (OTDR) 49 shown in FIG. 9, in the real-time measurement, it is extremely difficult to comply with such kinds of desires in view of the many problems described above.

Patent Document 1: Jpn. Pat. Appln. KOKAI Publication No. 04-158237

Non-Patent Document 1: "Backscattering Measurement and Fault Location in Optical Fibers" Kenji OKADA et al. THE TRANSACTION OF THE IECE JAPAN. VOL. E 63. NO. 2. ABSTRACTS FEBRUARY 1980 pp 145-146

DISCLOSURE OF INVENTION

The present invention has been devised in view of the above problems, and its object is to provide an optical time domain reflectometer which sets attenuator values to optimum values based on a result of determining whether a waveform level of a marker as measurement position specifying means to be displayed on a display section falls within a preset effective measurement level range, and measures a measured optical fiber so as to enable waveform observation on a desired position with an excellent S/N ratio of not less than a predetermined value merely by moving the marker to a target position and easily enable measurement of even reflection attenuation where a level difference of the measurement waveforms is large automatically according to a level fluctuation due to a change in the state of the measured optical fiber in real-time measurement, and a method for testing optical fiber using an optical pulse.

In order to achieve the above-described object, a first aspect of the present invention provides an optical time domain reflectometer comprising:

a light source (54) which emits an optical pulse to be incident on a measured optical fiber (61);

a light receiving section (56) which receives backscattered light returned form the measured optical fiber (61) according to the optical pulse emitted from the light source (54);

an equivalent attenuator (ATT) (11) composed of an amplifying section (57) which amplifies an output signal from the light receiving section (56) with a predetermined gain, and a signal-averaged processing section (58) which adds the output signals amplified by the amplifying section (57) a predetermined number of times so as to average them;

a logarithmic converting section (59) which logarithmically converts the output signal from the equivalent attenuator (ATT) (11);

a waveform memory (62) which stores therein the output signal from the logarithmic converting section (59) as waveform data;

a display section (60) which reads the waveform data stored in the waveform memory (62) so as to display the data as a measurement waveform on a screen;

a marker setting section (63) which sets markers arbitrarily on the measurement waveform displayed on the screen of the display section (60) and enables marker set positions to be moved;

an attenuator (ATT) value setting condition memory section (6) which stores therein a plurality of attenuator (ATT) value setting conditions for real-time measurement which are preset correspondingly to the set positions of the markers set on the measurement waveform on the screen of the display section (60) by the marker setting section (63) and are composed of combinations of a gain a of the amplifying section (57) and the number of adding times m in the signal-averaged processing section (58) composing the equivalent attenuator (ATT) (11), and effective measurement level ranges ($\Delta Li$) which are preset for the plurality of attenuator (ATT) value setting conditions;

a marker level acquiring section (5) which acquires waveform levels on the set positions of the markers set movable on the measurement waveform displayed on the screen of the display section (60) by the marker setting section (63) from the waveform data stored in the waveform memory (62);

a level comparing section (8) which determines whether the waveform levels on the marker set positions acquired by the marker level acquiring section (5) fall within the effective measurement level ranges ($\Delta Li$) stored in the attenuator (ATT) value setting condition memory section (6);

an attenuator (ATT) value change determining section (9) which, when the level comparing section (8) determines that the waveform levels of the marker set positions acquired by the marker level acquiring section (5) do not fall within the effective measurement level ranges ($\Delta Li$) stored in the attenuator (ATT) value setting condition memory section (6), determines change in the attenuator (ATT) value setting conditions;

an attenuator (ATT) value setting condition changing section (7) which changes the attenuator (ATT) value setting conditions stored in the attenuator (ATT) value setting condition memory section (6) into new attenuator (ATT) value setting conditions where the waveform levels on the marker set positions acquired by the marker level acquiring section (5) fall within the effective measurement level ranges ($\Delta Li$) upon the determination of the change from the attenuator (ATT) value change determining section (9);

an attenuator (ATT) value setting section (10) which sets unchanged attenuator (ATT) value setting conditions stored in the attenuator (ATT) value setting condition memory section (6) or changed new attenuator (ATT) value setting conditions in the equivalent attenuator (ATT) (11); and a control section (3) which allows the measured optical fiber (61) to be measured based on the attenuator (ATT) value setting conditions set in the equivalent attenuator (ATT) (11) by the attenuator (ATT) value setting section (10), reads the waveform data stored in the waveform memory (62) and successively displays the data on the screen of the display section (60) so as to enable real-time measurement in which the measurement waveform displayed on the screen of the display section (60) is successively updated, wherein the attenuator (ATT) value setting conditions to be set on the equivalent attenuator (ATT) (11) are set at optimum values based on a result of determining whether the waveform levels of the markers as the measurement position specifying means set on the screen of the display section (60) by the marker setting section (63) fall within the preset effective measurement level range (ΔLi) and the measured optical fiber (61) is measured, and the waveforms on desired positions can be observed with good signal-to-noise ratio (S/N ratio) of not less than a predetermined value based on the measurement waveform displayed on the screen of the display section (60) solely by moving the markers to target positions by means of the marker setting section (63).

In order to achieve the above-described object, a second aspect of the present invention provides the optical time domain reflectometer according to the first aspect, wherein when the marker (1) set on a first position on the measurement waveform on the screen of the display section (60) by the marker setting section (63) is moved to a second position on the measurement waveform with a bad S/N ratio of not more than the predetermined value, the attenuator (ATT) value setting condition corresponding to the marker (1) on the second position is set to an optimum value and the measured optical fiber (61) is measured, so that the waveform on the second position can be observed with a good S/N ratio of not less than the predetermined value based on the measurement waveform displayed on the screen of the display section (60).

In order to achieve the above-described object, a third aspect of the present invention provides the optical time domain reflectometer according to the first aspect, further comprising:

a marker specifying section (2) which specifies a marker to be measured from a plurality of markers when the plurality of markers are arbitrarily set on the measurement waveform on the screen of the display section (60) by the marker setting section (63), wherein the attenuator (ATT) value setting condition memory section (6) has stored therein a plurality of attenuator (ATT) value setting conditions for real-time measurement which are preset correspondingly to the set positions of the plurality of markers set on the measurement waveform on the screen of the display section (60) by the marker setting section (63) and are composed of the combinations of a gain a of the amplifying section (57) and a number of adding times m in the signal-averaged processing section (58) composing the equivalent attenuator (ATT) (11), and effective measurement level ranges (ΔLi) which are preset for the plurality of attenuator (ATT) value setting conditions, the marker level acquiring section (5) acquires a waveform level on the set position of the marker to be measured, which is specified by the marker specifying section (2) from the plurality of markers set on the measurement waveform on the screen of the display section (60) by the marker setting section (63), from the waveform data stored in the waveform memory (62), the level comparing section (8) determines whether the waveform level on the set position of the marker to be measured acquired by the marker level acquiring section (5) falls within the effective measurement level range (ΔLi) stored in the attenuator (ATT) value setting condition memory section (6) and corresponding to the set position of the marker to be measured, the attenuator (ATT) value change determining section (9) determines change in the attenuator (ATT) value setting conditions when the level comparing section (8) determines that the waveform level of the set position of the marker to be measured does not fall within the effective measurement level range (ΔLi) which is stored in the attenuator (ATT) value setting condition memory section (6) and corresponds to the marker to be measured, the attenuator (ATT) value setting condition changing section (7) changes the attenuator (ATT) value setting conditions stored in the attenuator (ATT) value setting condition memory section (6) into new attenuator (ATT) value setting conditions where the waveform level on the set position of the marker to be measured acquired by the marker level acquiring section (5) falls within the effective measurement level range (ΔLi) upon the determination of the change from the attenuator (ATT) value change determining section (9), the attenuator (ATT) value setting section (10) sets unchanged attenuator (ATT) value setting conditions stored in the attenuator (ATT) value setting condition memory section (6) or changed new attenuator (ATT) value setting conditions correspondingly to the marker to be measured, in the equivalent attenuator (ATT) (11), the control section (3) allows the measured optical fiber (61) to be measured based on the attenuator (ATT) value setting conditions set in the equivalent attenuator (ATT) (11) by the attenuator (ATT) value setting section (10) correspondingly to the marker to be measured, reads the waveform data stored in the waveform memory (62) correspondingly to the marker to be measured and successively displays the data on the screen of the display section (60) so as to enable real-time measurement in which the measurement waveform displayed on the screen of the display section (60) is successively updated, the optical time domain reflectometer further comprising:

a waveform synthesizing section (4) which reads the waveform data corresponding to the marker to be measured acquired by the measurement based on the attenuator (ATT) value setting conditions set in the equivalent attenuator (ATT) (11) by the attenuator (ATT) value setting section (10) correspondingly to the marker to be measured and synthesizes the data so as to display the synthesized waveform data on the screen of the display section (60), and the attenuator (ATT) value setting conditions set in the equivalent attenuator (ATT) (11) are sequentially set to optimum values correspondingly to the plurality of markers based on the result of determining whether the waveform levels of the markers as the measurement position specifying means set on the screen of the display section (60) by the marker setting section (63) fall within the preset effective measurement level ranges (ΔLi), and the measured optical fiber (61) is repeatedly measured, so that the waveform on desired positions can be measured over a wide range with a good S/N ratio of not less than the predetermined value based on the measurement waveform of the synthesized waveform data displayed on the screen of the display section (60) and even reflection attenuation where the level difference of the measurement waveform is large is easily measured by automatically tracking a level fluctuation due to the change in the state of the measured optical fiber (61).

In order to achieve the above-described object, a fourth aspect of the present invention provides the optical time domain reflectometer according to the third aspect, wherein when the plurality of markers, which are set on the measurement waveform on the screen of the display section (60) by the marker setting section (63), include a first marker (1) set on a position just before Fresnel reflection on the measurement waveform and a second marker (2) set on a position of an apex of the Fresnel reflection on the measurement waveform, the attenuator (ATT) value setting conditions corresponding to the first marker (1) and the second marker (2) are set sequentially and the measured optical fiber (61) is repeatedly measured, so that the waveform level just before the Fresnel reflection and the level of the apex of the Fresnel reflection can be simultaneously observed with a good S/N ratio of not less than the predetermined value based on the measurement waveform of the synthesized waveform data displayed on the screen of the display section (60).

In order to achieve the above-described object, a fifth aspect of the present invention provides the optical time domain reflectometer according to the third aspect, further comprising:

a measurement frequency memory section (14) which stores measurement frequency Nimax showing the number of continuous and repeated measuring times on each of the plurality of markers, wherein the marker to be measured is measured repeatedly under the attenuator (ATT) value setting conditions corresponding to the marker to be measured based on the measurement frequency Nimax corresponding to the marker to be measured stored in the measurement frequency memory section (14), and then subsequent markers to be measured are repeatedly measured under the attenuator (ATT) value setting conditions corresponding to the subsequent markers to be measured based on the measurement frequency Nimax corresponding to the subsequent markers to be measured stored in the measurement frequency memory section (14).

In order to achieve the above-described object, a sixth aspect of the present invention provides the optical time domain reflectometer according to the fifth aspect, further comprising:

a level fluctuation detecting section (12) which detects a fluctuation in the waveform level corresponding to the marker to be measured acquired by the marker level acquiring section (5); and a measurement frequency setting section (13) which changes the measurement frequency corresponding to the marker stored in the measurement frequency memory section (14) according to presence/absence of the fluctuation in the waveform level corresponding to the marker to be measured detected by the level fluctuation detecting section (12).

In order to achieve the above-described object, a seventh aspect of the present invention provides the optical time domain reflectometer according to the third to sixth aspects, wherein the waveform synthesizing section (4) selects only waveform data about a waveform level included in the effective measurement level range ($\Delta$Li) corresponding to the marker to be measured from waveform data acquired by the repeated measurement so as to synthesize the waveform data.

In order to achieve the above-described object, an eighth aspect of the present invention provides a method for testing optical fiber using an optical pulse, comprising:

a step of emitting an optical pulse to be incident on a measured optical fiber (61);

a step of receiving backscattered light returned form the measured optical fiber (61) so as to convert the backscattered light into an electric signal;

a step of amplifying the electric signal with a predetermined gain by means of an amplifying section (57);

a step of adding output signals amplified by the amplifying section (57) a predetermined number of times by means of a signal-averaged processing section (58) composing an equivalent attenuator (ATT) (11) together with the amplifying section (57) so as to average the added signal;

a step of logarithmically converting the output signal from the equivalent attenuator (ATT) (11) by means of a logarithmic converting section (59);

a step of storing the output signal from the logarithmic converting section (59) as waveform data in a waveform memory (62);

a step of reading the waveform data stored in the waveform memory (62) so as to display the data as a measurement waveform on a screen of a display section (60);

a step of setting markers arbitrarily on the measurement waveform displayed on the screen of the display section (60) movably;

a step of storing a plurality of attenuator (ATT) value setting conditions for real-time measurement which are preset correspondingly to set positions of the markers set on the measurement waveform on the screen of the display section (60) and are composed of combinations of a gain a of the amplifying section (57) and the number of adding times m in the signal-averaged processing section (58) composing the equivalent attenuator (ATT) (11), and effective measurement level ranges ($\Delta$Li), which are preset for the plurality of attenuator (ATT) value setting conditions, in an attenuator (ATT) value setting condition memory section (6);

a step of acquiring waveform levels on the set positions of the markers set arbitrarily on the measurement waveform displayed on the screen of the display section (60) from the waveform data stored in the waveform memory (62);

a step of determining whether the waveform levels on the marker set positions acquired from the waveform data stored in the waveform memory (62) fall within the effective measurement level ranges ($\Delta$Li) stored in the attenuator (ATT) value setting condition memory section (6);

a step of, when the determination is made that the waveform levels of the marker set positions do not fall within the effective measurement level ranges ($\Delta$Li) stored in the attenuator (ATT) value setting condition memory section (6), determining a change in the attenuator (ATT) value setting conditions;

a step of changing the attenuator (ATT) value setting conditions stored in the attenuator (ATT) value setting condition memory section (6) into new attenuator (ATT) value setting conditions where the waveform levels on the marker set positions fall within the effective measurement level ranges ($\Delta$Li) upon the determination of the change in the attenuator (ATT) value setting conditions;

a step of setting unchanged attenuator (ATT) value setting conditions stored in the attenuator (ATT) value setting condition memory section (6) or changed new attenuator (ATT) value setting conditions in the equivalent attenuator (ATT) (11); and a step of allowing the measured optical fiber (61) to be measured based on the attenuator (ATT) value setting conditions set in the equivalent attenuator (ATT) (11), displaying the waveform data stored in the waveform memory (62) successively on the screen of the display section (60) so as to enable real-time measurement in which the measurement waveform displayed on the screen of the display section (60) is successively updated, wherein the attenuator (ATT) value setting conditions to be set on the equivalent attenuator (ATT) (11) are set to optimum values based on a result of determining whether the waveform levels of the markers as the measurement position specifying means set on the screen of the display section (60) fall within the preset effective measurement level ranges ($\Delta$Li) and the measured optical fiber (61) is measured, so that the waveform on a desired position can be observed with a good S/N ratio of not less than a predetermined value based on the measurement waveform displayed on the screen of the display section (60) merely by moving the markers to target positions.

In order to achieve the above-described object, a ninth aspect of the present invention provides the method for testing optical fiber using an optical pulse according to the eighth aspect, wherein when the marker (1) set on a first position on the measurement waveform on the screen of the display section (60) is moved to a second position on the measurement waveform with a bad S/N ratio of not more than the predetermined value, the attenuator (ATT) value setting conditions corresponding to the marker (1) on the second position are set to optimum values and the measured optical fiber (61) is measured, so that the waveform on the second position can be observed with a good S/N ratio of not less than the predetermined value based on the measurement waveform displayed on the screen of the display section (60).

In order to achieve the above-described object, a tenth aspect of the present invention provides the method for testing optical fiber using an optical pulse according to the eighth aspect, further comprising:

a step of specifying a marker to be measured from a plurality of markers when the plurality of markers are arbitrarily set on the measurement waveform displayed on the screen of the display section (60), wherein the attenuator (ATT) value setting condition memory section (6) has stored therein a plurality of attenuator (ATT) value setting conditions for the real-time measurement which are preset correspondingly to the set positions of the plurality of markers set on the measurement waveform on the screen of the display section (60) and are composed of the combinations of a gain a of the amplifying section (57) and the number of adding times m in the signal-averaged processing section (58) composing the equivalent attenuator (ATT) (11), and effective measurement level ranges (ΔLi) which are preset for the plurality of attenuator (ATT) value setting conditions, at the step of acquiring waveform levels on the set position of the markers, a waveform level corresponding to a set position of a marker to be measured in the plurality of markers set on the measurement waveform on the screen of the display section (60) is acquired from the waveform data stored in the waveform memory (62), at the step of determining the waveform level of the marker, the determination is made as to whether the waveform level on the set position of the marker to be measured falls within the effective measurement level range (ΔLi) stored in the attenuator (ATT) value setting condition memory section (6) and corresponding to the marker to be measured, at the step of determining the change in the attenuator (ATT) value setting conditions, when the determination is made that the waveform level on the set position of the marker to be measured does not fall within the effective measurement level range (ΔLi) corresponding to the marker to be measured stored in the attenuator (ATT) value setting condition memory section (6), the change in the attenuator (ATT) value setting conditions is determined, at the step of changing the attenuator (ATT) value setting conditions, the attenuator (ATT) value setting conditions stored in the attenuator (ATT) value setting condition memory section (6) are changed into new attenuator (ATT) value setting conditions where the waveform level on the set position of the marker to be measured falls within the effective measurement level range (ΔLi) upon the determination of the change in the attenuator (ATT) value setting conditions, at the step of setting in the equivalent attenuator (ATT) (11), unchanged attenuator (ATT) value setting conditions stored in the attenuator (ATT) value setting condition memory section (6) or changed new attenuator (ATT) value setting conditions are set in the equivalent attenuator (ATT) (11) correspondingly to the marker to be measured, at the step of enabling the real-time measurement, the measured optical fiber (61) is measured based on the attenuator (ATT) value setting conditions set in the equivalent attenuator (ATT) (11) correspondingly to the marker to be measured, the waveform data stored in the waveform memory (62) correspondingly to the marker to be measured is read and is successively displayed on the screen of the display section (60) so that the real-time measurement in which the measurement waveform displayed on the screen of the display section (60) is successively updated is enabled, the method further comprising:

a step of reading the waveform data corresponding to the marker to be measured acquired by the measurement based on the attenuator (ATT) value setting conditions set in the equivalent attenuator (ATT) (11) by the attenuator (ATT) value setting section (10) correspondingly to the marker to be measured from the waveform memory (62) and synthesizing the data so as to display the synthesized waveform data on the screen of the display section (60), and the attenuator (ATT) value setting conditions set in the equivalent attenuator (ATT) (11) are sequentially set to optimum values correspondingly to the plurality of markers based on the result of determining whether the waveform levels of the markers as the measurement position specifying means displayed on the screen of the display section (60) fall within the preset effective measurement level ranges (ΔLi), and the measured optical fiber (61) is repeatedly measured, so that the waveforms on desired positions can be observed over a wide range with a good S/N ratio of not less than the predetermined value based on the measurement waveform of the synthesized waveform data displayed on the screen of the display section (60), and even reflection attenuation where the level difference of the measurement waveform is large can be easily measured by automatically tracking a level fluctuation due to the change in the state of the measured optical fiber (61).

In order to achieve the above-described object, an eleventh aspect of the present invention provides the method for testing optical fiber using an optical pulse according to the tenth aspect, wherein when the plurality of markers set on the measurement waveform on the screen of the display section (60) include a first marker (1) set on a position just before Fresnel reflection on the measurement waveform and a second marker (2) set on a position of an apex of the Fresnel reflection on the measurement waveform, the attenuator (ATT) value setting conditions corresponding to the first marker (1) and the second marker (2) are set sequentially and the measured optical fiber (61) is repeatedly measured, so that the waveform level just before the Fresnel reflection and the level of the apex of the Fresnel reflection can be simultaneously observed with a good S/N ratio of not less than the predetermined value based on the measurement waveform of the synthesized waveform data displayed on the screen of the display section (60).

In order to achieve the above-described object, a twelfth aspect of the present invention provides the method for testing optical fiber using an optical pulse according to the tenth aspect, further comprising:

a step of storing a measurement frequency (Nimax) showing the number of continuous and repeated measuring times on each of the plurality of markers in a measurement frequency memory section (14), wherein the marker to be measured is measured repeatedly under the attenuator (ATT) value setting conditions corresponding to the marker to be measured based on the measurement frequency (Nimax) corresponding to the marker to be measured stored in the measurement frequency memory section (14), and subsequent markers to be measured is repeatedly measured under the attenuator (ATT) value setting condition corresponding to the subsequent markers to be measured based on the measurement frequency Nimax corresponding to the subsequent marker to be measured stored in the measurement frequency memory section (14).

In order to achieve the above-described object, a thirteenth aspect of the present invention provides the method for testing optical fiber using an optical pulse according to the twelfth aspect, further comprising:

a step of detecting a fluctuation in the waveform level corresponding to the marker to be measured; and a step of changing the measurement frequency corresponding to the marker stored in the measurement frequency memory section (14) according to presence/absence of the fluctuation in the waveform level corresponding to the marker to be measured.

In order to achieve the above-described object, a fourteenth aspect of the present invention provides the method for testing optical fiber using an optical pulse according to the twelfth aspect, wherein at the step of displaying the synthesized waveform data on the screen of the display section (60), only waveform data about a waveform level included in the effective measurement level range ($\Delta Li$) corresponding to the marker to be measured is selected from waveform data acquired by the repeated measurement so that the waveform data are synthesized.

According to the optical time domain reflectometer of the first aspect of the present invention and the method for testing optical fiber using an optical pulse of the eight aspect of the present invention, in the real-time measurement, the attenuator (ATT) value setting conditions to be set in the equivalent attenuator (ATT) (11) are set to an optimum value based on the result of determining whether the waveform level of the marker as the measurement position specifying means to be set on the screen of the display section (60) falls within the preset effective measurement level range, and the measured optical fiber (61) is measured, so that a waveform on a desired position can be observed with a good S/N ratio of not less than the predetermined value based on the waveform data displayed on the screen of the display section (60) merely by moving the marker to a target position.

According to the optical time domain reflectometer of the second aspect of the present invention and the method for testing optical fiber using an optical pulse of the ninth aspect of the present invention, in the real-time measurement, when the marker set on the first position on the measurement waveform is moved to the second position where the unsatisfactory S/N ratio is not more than the predetermined value on the measurement waveform, the attenuator (ATT) value setting conditions corresponding to the marker on the second position are set to optimum values, and the measured optical fiber (61) is measured. As a result, the waveform on the second position can be observed with an excellent S/N ratio of not less than the predetermined value based on the respective synthesized waveform data to be displayed on the screen of the display section (60).

According to the optical time domain reflectometer of the third aspect of the present invention and the method for testing optical fiber using an optical pulse of the tenth aspect of the present invention, in the real-time measurement, the attenuator (ATT) value setting conditions to be set on the equivalent attenuators (ATT) (11) are sequentially set to optimum values based on the result of determining whether the waveform levels of the plurality of markers as the measurement position specifying means to be set on the screen of the display section (60) fall within the preset effective measurement level ranges, and the measured optical fiber (61) is repeatedly measured, so that a waveform on the desired position can be observed with an excellent S/N ratio of not less than the predetermined value over a wide range based on the respective synthesized waveform data displayed on the screen of the display section (60).

According to the optical time domain reflectometer of the fourth aspect of the present invention and the method for testing optical fiber using an optical pulse of the eleventh aspect of the present invention, in the real-time measurement, particularly the waveform level just before the Fresnel reflection and the level of the apex of the Fresnel reflection can be simultaneously observed with an excellent S/N ratio of not less than the predetermined value, and the change in the reflection attenuation can be observed in approximately real time.

As a result, according to the optical time domain reflectometer of the present invention and the method for testing optical fiber using an optical pulse of the present invention, the reflection attenuation where the level difference between objects to be measured is large can be measured easily in real time.

Further, according to the optical time domain reflectometer of the present invention and the method for testing optical fiber using an optical pulse of the present invention, at the time of the real-time measurement, a operator does not have to manually adjust the attenuator (gain and attenuation) according to the waveform level, and the operator merely has to move any marker to the target position on the display screen if necessary, so as to observe the waveform on the desired position with the S/N ratio of not less than the predetermined value.

According to according to the optical time domain reflectometer of the sixth aspect of the present invention and the method for testing optical fiber using an optical pulse of the thirteenth aspect of the present invention, in the real-time measurement, when the attenuators are set for the plurality of markers, the measurement frequency can be changed according to the fluctuation in the level on the waveform position specified by the marker, and when the fluctuation in the level on the waveform position specified by the marker is small, the measurement frequency is lowered, and when the fluctuation in the level is large, the measurement frequency is temporarily raised, so that the change in the measurement waveform can be quickly and easily catched.

BRIEF DESCRIPTION OF DRAWINGS

FIG. 1 is a block diagram illustrating a configuration of an optical pulse tester (OTDR) to which an optical time domain reflectometer and a method for testing optical fiber using an optical pulse according to one embodiment of the present invention are applied.

FIG. 3 is a flow chart illustrating a measuring operation where a level is adjusted to a marker position in FIG. 2.

FIG. 4C is a flow chart illustrating another example of the operation of the change presence/absence determining process for the marker numbers i in FIG. 2.

FIG. 5A is a diagram illustrating one example of real-time measurement by means of the optical time domain reflectometer in FIG. 1.

FIG. 5B is a diagram illustrating one example of the real-time measurement by means of the optical time domain reflectometer in FIG. 1.

FIG. 8 is a diagram illustrating one example of measurement frequency Nimax for each marker set on the measurement waveform in FIG. 6.

BEST MODE FOR CARRYING OUT THE INVENTION

Figure 2:
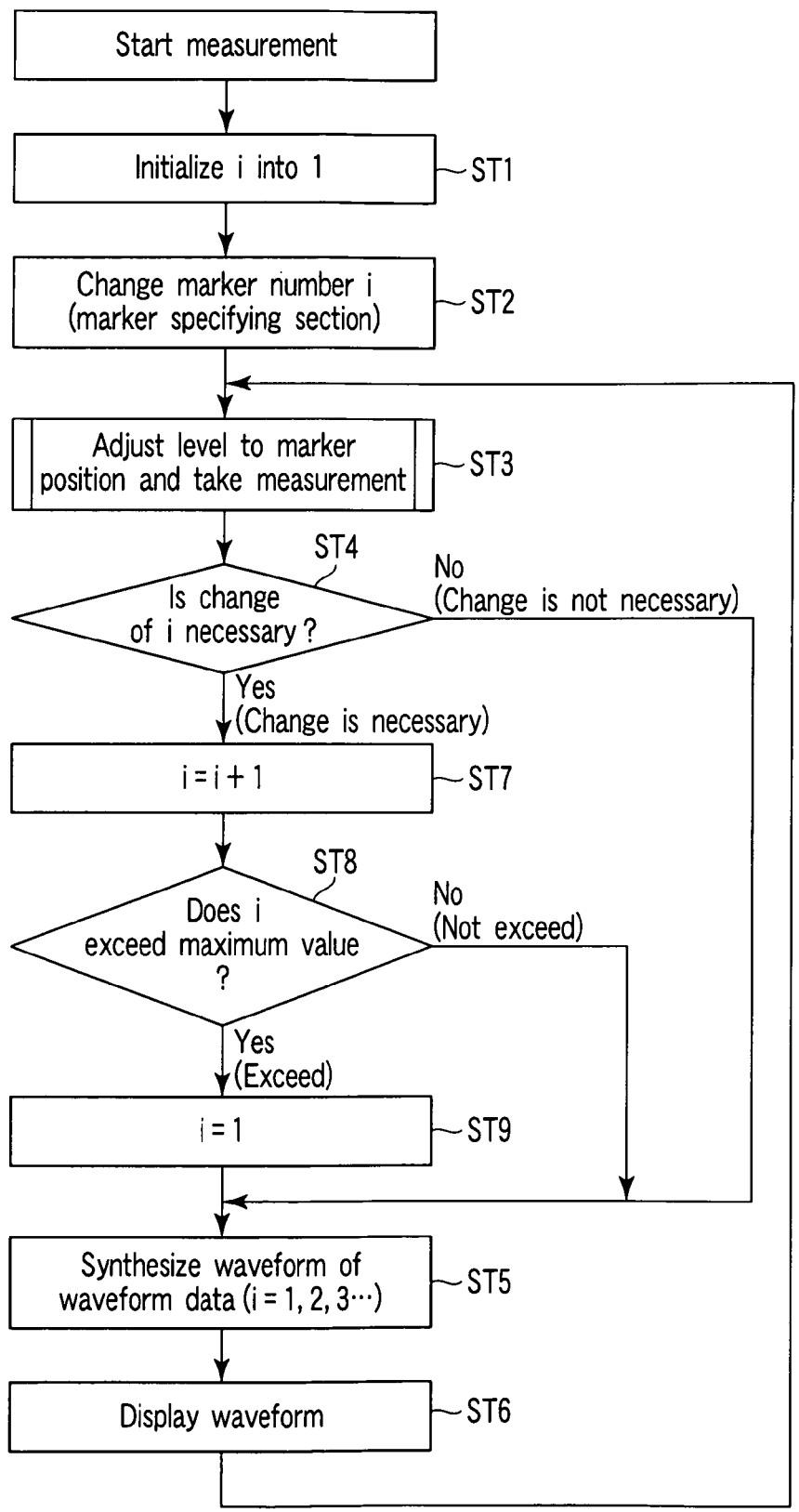
FIG. 2 is a flow chart illustrating an operation of a measurement level change function of the optical time domain reflectometer in FIG. 1.

An optical time domain reflectometer and a method for testing optical fiber using an optical pulse according to an embodiment of the present invention will be described below in detail with reference to the drawings.

FIG. 1 is a block diagram illustrating a configuration of an optical pulse tester (OTDR) to which an optical time domain reflectometer and a method for testing optical fiber using an optical pulse according to one embodiment of the present invention are applied.

Basic Configuration

As shown in FIG. 1, the optical time domain reflectometer of the present invention basically includes: a light source 54 which emits a light pulse to be incident on a measured optical fiber 61; a light receiving section 56 which receives backscattered light returned from the measured optical fiber 61 according to the optical pulse emitted from the light source 54; an equivalent attenuator (ATT) 11 composed of an amplifying section 57 which amplifies an output signal from the light receiving section 56 with a predetermined gain and a signal-averaged processing section 58 which adds the output signals amplified by the amplifying section 57 a predetermined number of times so as to average the added result; a logarithmic converting section 59 which logarithmically converts the output signal from the equivalent attenuator (ATT) 11; a waveform memory 62 which stores the output signal from the logarithmic converting section 59 as waveform data; a display section 60 which displays the waveform data stored in the waveform memory 62 as a measurement waveform on a screen; a marker setting section 63 which sets any marker on the measurement waveform displayed on the screen of the display section 60 and can move a setting position of the marker; an attenuator (ATT) value setting condition memory section 6 which stores a plurality of attenuator (ATT) value setting conditions for real-time measurement, which are preset correspondingly to the marker setting positions set on the measurement waveform on the screen of the display section 60 by the marker setting section 63 and are composed of combinations of a gain a of the amplifying section 57 and a number of adding times m in the signal-averaged processing section 58 composing the equivalent attenuator (ATT) 11, and effective measurement level ranges ΔLi preset for the plurality of attenuator (ATT) value setting conditions therein; a marker level acquiring section 5 which acquires a waveform level on a set position of any marker set on the measurement waveform displayed on the screen of the display section 60 by the marker setting section 63 from the waveform data stored in the waveform memory 62; a level comparing section 8 which determines whether the waveform level on the marker set position acquired by the marker level acquiring section 5 falls within the effective measurement level range ΔLi stored in the attenuator (ATT) value setting condition memory section 6; an attenuator (ATT) value change determining section 9 which, when the level comparing section 8 determines that the waveform level acquired by the marker level acquiring section (5) is not within the effective measurement level range ΔLi stored in the attenuator (ATT) value setting condition memory section (6), changes the attenuator (ATT) value setting conditions; an attenuator (ATT) value setting condition changing section 7 which changes the attenuator (ATT) value setting conditions stored in the attenuator (ATT) value setting condition memory section 6 into new attenuator (ATT) value setting conditions such that the waveform level on the marker set position acquired by the marker level acquiring section 5 is included in the effective measurement level range ΔLi upon the determination of the change from the attenuator (ATT) value change determining section 9; an attenuator (ATT) value setting section 10 which sets unchanged attenuator (ATT) value setting conditions or changed new attenuator (ATT) value setting conditions stored in the attenuator (ATT) value setting condition memory section 6 in the equivalent attenuator (ATT) 11; and a control section 3 which measures the measured optical fiber 61 based on the attenuator (ATT) value setting conditions set in the equivalent attenuator (ATT) 11 by the attenuator (ATT) value setting section 10, reads the waveform data stored in the waveform memory 62 and displays the data sequentially on the screen of the display section 60 so as to enable real-time measurement such that the display of the measurement waveform is updated successively. The attenuator (ATT) value setting conditions to be set in the equivalent attenuator (ATT) 11 are set to an optimum value based on a result of determining whether the waveform level of the marker as the measurement position specifying means set on the screen of the display section 60 by the marker setting section 63 falls within the effective measurement level range ΔLi, and the measured optical fiber 61 is measured, so that the waveform on a desired position can be observed with a good S/N ratio of not less than a predetermined value based on the waveform data displayed on the screen of the display section 60 merely by moving the marker to a target position using the marker setting section 63.

That is to say, the basic configuration of the optical time domain reflectometer includes a case where one or more markers are set by the marker setting section 63.

In the optical time domain reflectometer in this case, preferably, when the marker setting section 63 moves a marker 1 set on a first position on the measurement waveform to a second position where an unsatisfactory S/N ratio is not more than a predetermined value on the measurement waveform, the attenuator (ATT) value setting conditions corresponding to the marker 1 on the second position are set to optimum values, and the measured optical fiber 61 is measured. As a result, the waveform on the second position can be observed with an excellent S/N ratio of not less than the predetermined value based on the measurement waveform displayed on the screen of the display section 60.

The optical time domain reflectometer of the present invention includes a case where two or more markers are set by the marker setting section 63.

The optical time domain reflectometer in this case preferably further includes a marker specifying section 2 which, when the marker setting section 63 arbitrarily sets a plurality of markers on the measurement waveform, specifies a marker to be measured from the plurality of markers.

In this case, the attenuator (ATT) value setting condition memory section 6 has stored therein a plurality of attenuator ATT value setting conditions for real-time measurement which are preset correspondingly to a plurality of marker set positions set on the measurement waveform on the screen of the display section 60 by the marker setting section 63 and are composed of combinations of a gain a of the amplifying section 57 and a number of adding times m in the signal-averaged processing section 58 composing the equivalent attenuator (ATT) 11, and effective measurement level ranges ΔLi preset for the plurality of attenuator (ATT) value setting conditions.

The marker level acquiring section 5 acquires a waveform level corresponding to the set position of a marker to be measured, which is specified by the marker setting section 2 from the plurality of markers set on the measurement waveform on the screen of the display section 60 by the marker setting section 63, from the waveform data stored in the waveform memory 62.

Further, the level comparing section 8 determines whether the waveform level corresponding to the set position of the marker to be measured which is acquired by the marker level acquiring section 5 falls within the effective measurement level range ΔLi corresponding to the marker set position to be measured stored in the attenuator (ATT) value setting condition memory section 6.

The attenuator (ATT) value change determining section 9 determines a change in the attenuator (ATT) value setting conditions when the level comparing section 8 determines that the waveform level corresponding to the set position of the marker to be measured does not fall within the effective measurement level range ΔLi corresponding to the marker to be measured stored in the attenuator (ATT) value setting condition memory section 6.

The attenuator (ATT) value setting condition calculating section 7 receives the determination of the change from the attenuator (ATT) value change determining section 9, and changes the attenuator (ATT) value setting conditions stored in the attenuator (ATT) value setting condition memory section 6 into new attenuator (ATT) value setting conditions such that the waveform level corresponding to the set position of the marker to be measured acquired by the marker level acquiring section 5 is included in the effective measurement level range ΔLi.

The attenuator (ATT) value setting section 10 sets unchanged attenuator (ATT) value setting conditions or changed new attenuator (ATT) value setting conditions stored in the attenuator (ATT) value setting condition memory section 6 in the equivalent attenuator (ATT) 11 correspondingly with the marker to be measured.

The control section 3 allows the measured optical fiber 61 to be measured based on the attenuator (ATT) value setting conditions set in the equivalent attenuator (ATT) 11 by the attenuator (ATT) value setting section 10 correspondingly with the marker to be measured, and successively displays the waveform data stored in the waveform memory 62 on the screen of the display section 60 correspondingly with the marker to be measured so as to enable the real-time measurement such that the display of the measurement waveform is successively updated.

The optical time domain reflectometer in this case preferably further includes a waveform synthesizing section 4 which reads the waveform data corresponding to the marker to be measured acquired by the measurement based on the attenuator (ATT) value setting conditions set in the equivalent attenuator (ATT) 11 by the attenuator (ATT) value setting section 10 correspondingly with the marker to be measured from the waveform memory 62, and synthesizes the data, so as to display the synthesized waveform data on the screen of the display section 60.

In the optical time domain reflectometer in this case, the attenuator (ATT) value setting conditions to be set in the equivalent attenuator (ATT) 11 are sequentially set to optimum values correspondingly with the plurality of markers based on the result of determining whether the waveform levels of the plurality of markers as the measurement position specifying means set on the screen of the display section 60 by the marker setting section 63 fall within the preset effective measurement level ranges ΔLi, and the measured optical fiber 61 is repeatedly measured. As a result, the waveform on a desired position can be observed with a good S/N ratio of not less than the predetermined value over a wide range based on the synthesized waveform data displayed on the screen of the display section 60, and even reflection attenuation where the level difference of the measurement waveform is large can be easily measured by automatically tracking the level fluctuation due to a state change of the measured optical fiber 61.

In the optical time domain reflectometer in this case, preferably, when the plurality of markers set on the measurement waveform by the marker setting section 63 includes a first marker 1 set on a position just before Fresnel reflection on the measurement waveform and a second marker 2 set on a position of an apex of the Fresnel refection on the measurement waveform, the attenuator (ATT) value setting conditions corresponding to the first marker 1 and the second marker 2 are sequentially set, and the measured optical fiber 61 is repeatedly measured. As a result, the waveform level just before the Fresnel reflection and the level of the apex of the Fresnel reflection are simultaneously observed with a good S/N ratio of not less than the predetermined value based on the synthesized waveform data displayed on the screen of the display section 60.

The optical time domain reflectometer in this case preferably includes a measurement frequency memory section 14 which has stored therein measurement frequency Nimax showing the number of repeated measuring times on each of the plurality of markers. A marker to be measured is continuously and repeatedly measured by using the attenuator (ATT) value setting conditions corresponding to the marker based on the measurement frequency Nimax corresponding to the marker to be measured stored in the measurement frequency memory section 14. Thereafter, subsequent markers to be measured is repeatedly measured by using the attenuator (ATT) value setting conditions corresponding to the subsequent markers to be measured based on the measurement frequency Nimax corresponding to the subsequent markers to be measured stored in the measurement frequency memory section 14.

The optical time domain reflectometer in this case preferably further includes a level fluctuation detecting section 12 which detects a fluctuation in the waveform level corresponding to the marker to be measured acquired by the marker level acquiring section 5, and a measurement frequency setting section 13 which changes the measurement frequency corresponding to the marker stored in the measurement frequency memory section 14 according to the presence/absence of the fluctuation in the waveform level corresponding to the marker to be measured detected by the level fluctuation detecting section 12.

In the optical time domain reflectometer in this case, preferably, the waveform synthesizing section 4 selects only waveform data of the waveform level included in the effective measurement level range $\Delta Li$ corresponding to the marker to be measured from the waveform data repeatedly measured so as to synthesize the measurement waveforms.

As shown in FIG. 1, the method for testing optical fiber using an optical pulse of the present invention basically includes: a step of emitting an optical pulse to be incident on the measured optical fiber 61; a step of receiving backscattered light returned from the measured optical fiber 61 so as to convert the backscattered light into an electric signal; a step of amplifying the electric signal with a predetermined gain in the amplifying section 57; a step of adding output signals amplified by the amplifying section 57 a predetermined number of times by means of the signal-averaged processing section 58 composing the equivalent attenuator (ATT) 11 together with the amplifying section 57 and averaging them; a step of logarithmically converting an output signal from the equivalent attenuator (ATT) 11 in the logarithmic converting section 59; a step of storing the output signal from the logarithmic converting section 59 as the waveform data into the waveform memory 62; a step of displaying the waveform data stored in the waveform memory 62 as a measurement waveform on the screen of the display section 60; a step of arbitrarily setting a marker movable on the measurement waveform displayed on the screen of the display section 60; a step of storing the plurality of attenuator (ATT) value setting conditions for the real-time measurement which are preset correspondingly with the set position of the marker set on the measurement waveform on the screen of the display section 60 and are composed of the combinations of the gain a of the amplifying section 57 and the number of adding times m in the signal-averaged processing section 58 composing the equivalent attenuator (ATT) 11, and the effective measurement level ranges ($\Delta Li$) preset for the respective attenuator (ATT) value setting conditions in the attenuator (ATT) value setting condition memory section 6; a step of acquiring a waveform level on the set position of the marker arbitrarily set on the measurement waveform displayed on the screen of the display section 60 from the waveform data stored in the waveform memory 62; a step of determining whether the waveform level on the marker set position acquired from the waveform data stored in the waveform memory 62 falls within the effective measurement level range $\Delta Li$ stored in the attenuator (ATT) value setting condition memory section 6; a step of determining a change in the attenuator (ATT) value setting conditions when the waveform level on the marker set position does not fall within the effective measurement level range $\Delta Li$ stored in the attenuator (ATT) value setting condition memory section 6; a step of changing the attenuator (ATT) value setting conditions stored in the attenuator (ATT) value setting condition memory section 6 into new attenuator (ATT) value setting conditions where the waveform level on the marker set position is included in the effective measurement level range $\Delta Li$ upon the determination of the change of the attenuator (ATT) value setting conditions; a step of setting unchanged attenuator (ATT) value setting conditions or changed new attenuator (ATT) value setting conditions stored in the attenuator (ATT) value setting condition memory section 6 in the equivalent attenuator (ATT) 11; and a step of measuring the measured optical fiber 61 based on the attenuator (ATT) value setting conditions set in the equivalent attenuator (ATT) 11, reading the waveform data stored in the waveform memory (62) and successively displaying the data on the screen of the display section 60 so as to enable the real-time measurement such that the display of the measurement waveform is successively updated. The attenuator (ATT) value setting conditions to be set in the equivalent attenuator (ATT) 11 are set to optimum values based on the result of determining whether the waveform level of the marker as the measurement position specifying means displayed on the screen of the display section 60 falls within the preset effective measurement level range $\Delta Li$, and the measured optical fiber 61 is measured, so that a waveform on a desired position can be observed with an excellent S/N ratio of not less than a predetermined value based on the waveform data displayed on the screen of the display section 60 merely by moving the marker to a target position.

That is to say, the basic configuration of the method for testing optical fiber using an optical pulse includes a case where one or more markers are set on the measurement waveform.

In the method for testing optical fiber using an optical pulse in this case, preferably, when a marker 1 set on a first position on the measurement waveform is moved to a second position where the unsatisfactory S/N ratio is not more than a predetermined value on the measurement waveform, the attenuator (ATT) value setting conditions corresponding to the marker 1 on the second position are set to optimum values, and the measured optical fiber 61 is measured. As a result, the waveform on the second position can be observed with a good S/N ratio of not less than the predetermined value based on the waveform data displayed on the screen of the display section 60.

The method for testing optical fiber using an optical pulse of the present invention includes a case where two or more markers are set on the measurement waveform.

The method for testing optical fiber using an optical pulse in this case preferably further includes a step of, when a plurality of markers are arbitrarily set on the measurement waveform, specifying a marker to be measured from the plurality of markers.

The attenuator (ATT) value setting condition memory section 6 has stored therein a plurality of attenuator (ATT) value setting conditions for the real-time measurement which are preset correspondingly with a plurality of marker set positions set on the measurement waveform on the screen of the display section 60 and are composed of the combinations of the gain a of the amplifying section 57 and the number of adding times m in the signal-averaged processing section 58 composing the equivalent attenuator (ATT) 11, and the effective measurement level ranges ΔLi preset for the plurality of attenuator (ATT) value setting conditions.

At the step of acquiring the waveform level on the marker set position, a waveform level corresponding to the set position of the marker to be measured in the plurality of markers set on the measurement waveform on the screen of the display section 60 is acquired from the waveform data stored in the waveform memory 62.

Further, at the step of determining the waveform level of the marker, a determination is made as to whether the waveform level corresponding to the set position of the marker to be measured falls within the effective measurement level range ΔLi corresponding to the marker to be measured stored in the attenuator (ATT) value setting condition memory section 6.

At the step of determining the change of the attenuator (ATT) value setting condition, when the determination is made that the waveform level corresponding to the set position of the marker to be measured does not fall within the effective measurement level range ΔLi corresponding to the marker to be measured stored in the attenuator (ATT) value setting condition memory section (6), a change in the attenuator (ATT) value setting condition is determined.

At the step of changing the attenuator (ATT) value setting conditions, the attenuator (ATT) value setting conditions stored in the attenuator (ATT) value setting condition memory section 6 are changed into new attenuator (ATT) value setting conditions such that the waveform level corresponding to the set position of the marker to be measured is included in the effective measurement level range ΔLi upon the determination of the change of the attenuator (ATT) value setting conditions.

At the step of setting in the equivalent attenuator (ATT) 11, unchanged attenuator (ATT) value setting conditions or changed new attenuator (ATT) value setting conditions stored in the attenuator (ATT) value setting condition memory section 6 correspondingly with the marker to be measured are set in the equivalent attenuator (ATT) 11.

At the step of enabling the real-time measurement, the measured optical fiber 61 is measured based on the attenuator (ATT) value setting conditions set in the equivalent attenuator (ATT) 11 correspondingly with the marker to be measured, and the waveform data stored in the waveform memory 62 correspondingly with the marker to be measured is successively displayed on the screen of the display section 60 so that the real-time measurement is enabled such that the display of the measurement waveform is successively updated.

The method for testing optical fiber using an optical pulse in this case preferably further includes a step of reading the waveform data corresponding to the markers to be measured acquired by the measurement based on the attenuator (ATT) value setting conditions set in the equivalent attenuator (ATT) 11 by the attenuator (ATT) value setting section 10 correspondingly with the markers to be measured from the waveform memory 62 and synthesizing the data, so as to display the synthesized waveform data on the screen of the display section 60.

In the method for testing optical fiber using an optical pulse in this case, the attenuator (ATT) values to be set in the equivalent attenuator (ATT) 11 are sequentially set to optimum values correspondingly with the plurality of markers based on the result of determining whether the waveform levels of the plurality of markers as the measurement position specifying means displayed on the screen of the display section 60 fall within the preset effective measurement level ranges ΔLi, and the measured optical fiber 61 is repeatedly measured. As a result, the waveform on the desired position can be observed with a good S/N ratio of not less than the predetermined value over a wide range based on the synthesized waveform data displayed on the screen of the display section 60, and even the reflection attenuation where the level difference of the measurement waveforms is large can be easily measured automatically according to the level fluctuation due to a state change of the measured optical fiber 61.

In the method for testing optical fiber using an optical pulse in this case, preferably, when the plurality of markers set on the measurement waveform include a first marker 1 set on a position just before Fresnel reflection on the measurement waveform and a second marker 2 set on a position of an apex of the Fresnel refection on the measurement waveform, the attenuator (ATT) value setting conditions corresponding to the first marker 1 and the second marker 2 are sequentially set, and the measured optical fiber 61 is repeatedly measured. As a result, the waveform level just before the Fresnel reflection and the level of the apex of the Fresnel reflection are simultaneously observed with a good S/N ratio of not less than the predetermined value based on the synthesized waveform data displayed on the screen of the display section 60.

The method for testing optical fiber using an optical pulse in this case preferably includes a step of storing measurement frequency Nimax showing the number of repeated measuring times for each of the plurality of markers in the measurement frequency memory section 14. A marker to be measured is repeatedly measured by using the attenuator (ATT) value setting condition corresponding to the marker to be measured based on the measurement frequency Nimax corresponding to the marker to be measured stored in the measurement frequency memory section 14. Thereafter, subsequent markers to be measured is repeatedly measured by using the attenuator (ATT) value setting condition corresponding to the subsequent markers to be measured based on the measurement frequency Nimax corresponding to the subsequent markers to be measured stored in the measurement frequency memory section 14.

The method for testing optical fiber using an optical pulse in this case preferably further includes a step of detecting a fluctuation in the waveform level corresponding to the marker to be measured, and a step of changing the measurement frequency according to the marker stored in the measurement frequency memory section 14 according to the presence/absence of the fluctuation in the waveform level corresponding to the marker to be measured.

In the method for testing optical fiber using an optical pulse in this case, preferably, at the step of displaying the synthesized waveform data on the screen of the display section 60, only waveform data of the waveform level included in the effective measurement level range ΔLi corresponding to the marker to be measured is selected from the waveform data repeatedly measured so that the measurement waveforms are synthesized.

Specific Embodiment

A specific embodiment of the optical pulse tester (OTDR) to which the optical time domain reflectometer (OTDR) and the method for testing optical fiber using an optical pulse of the present invention are applied will be described below with reference to FIG. 1.

As is clear from the description of the basic configuration, the optical pulse tester (OTDR) 1 as the specific embodiment to which the optical time domain reflectometer and the method for testing optical fiber using an optical pulse of the present invention are applied includes a measurement level changing function of automatically and selectively setting optimum attenuator (ATT) values in cooperation with a marker position specified on the measurement waveform by an operator on the display screen, and changing the measurement level so that the measurement waveform can be observed with a good S/N ratio of not less than the predetermined value in the real-time measurement.

The measurement level changing function includes: a function of automatically and selectively setting optimum attenuator values for one or not less than two markers, and changing and measuring the measurement level so that the good S/N ratio of not less than the predetermined value can be obtained, so as to display measurement waveforms before and after the change of the measurement level in the case of one marker; a function of synthesizing and displaying the measurement waveforms in the case of not less than two markers; and a function of making the measurement frequency different according to the level fluctuation of the measurement waveform when attenuator (ATT) values are set for the respective markers.

Figure 9:
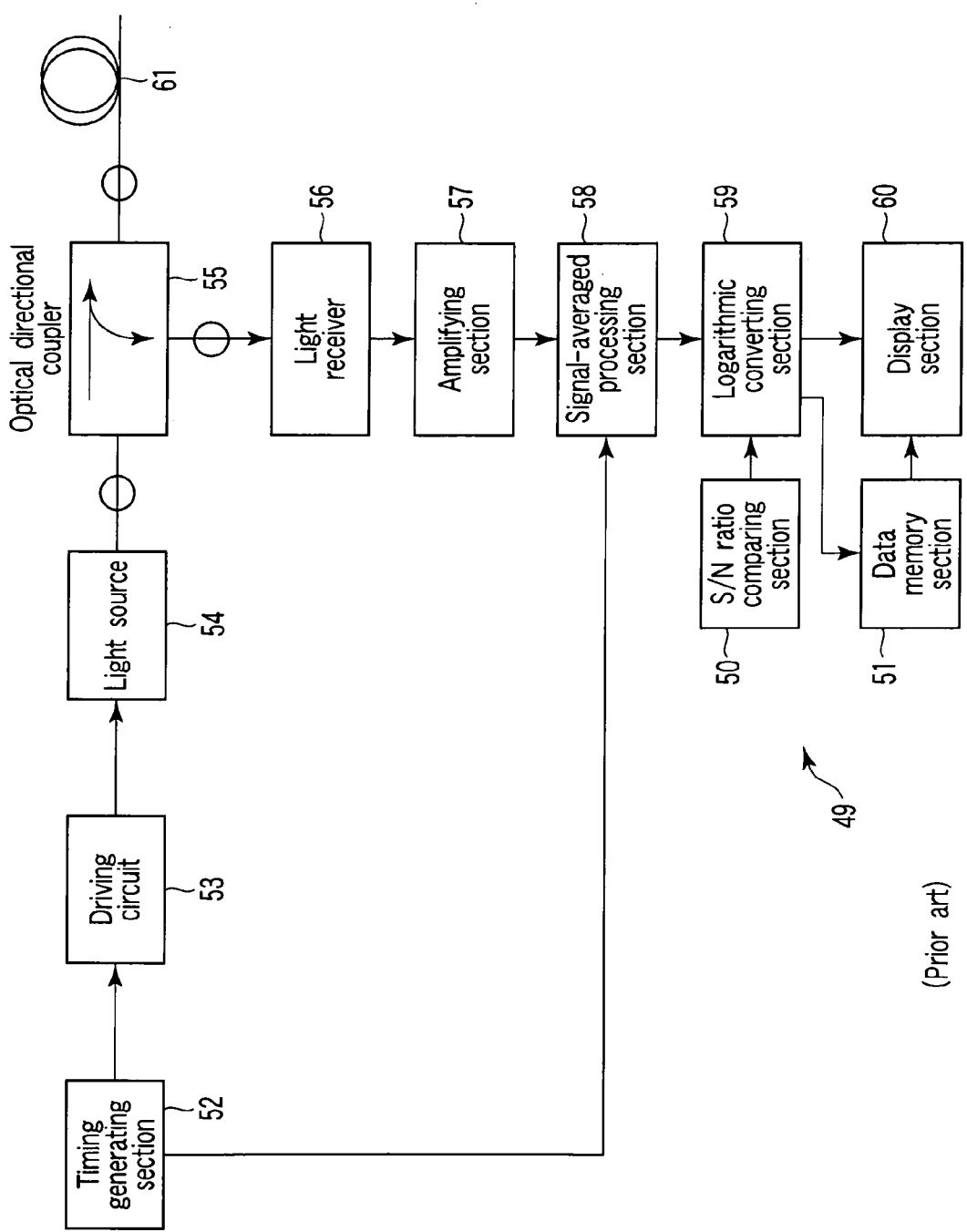
FIG. 9 is a block diagram illustrating a configuration of a conventional optical pulse tester (OTDR) disclosed in Patent Document 1.
Figure 10:
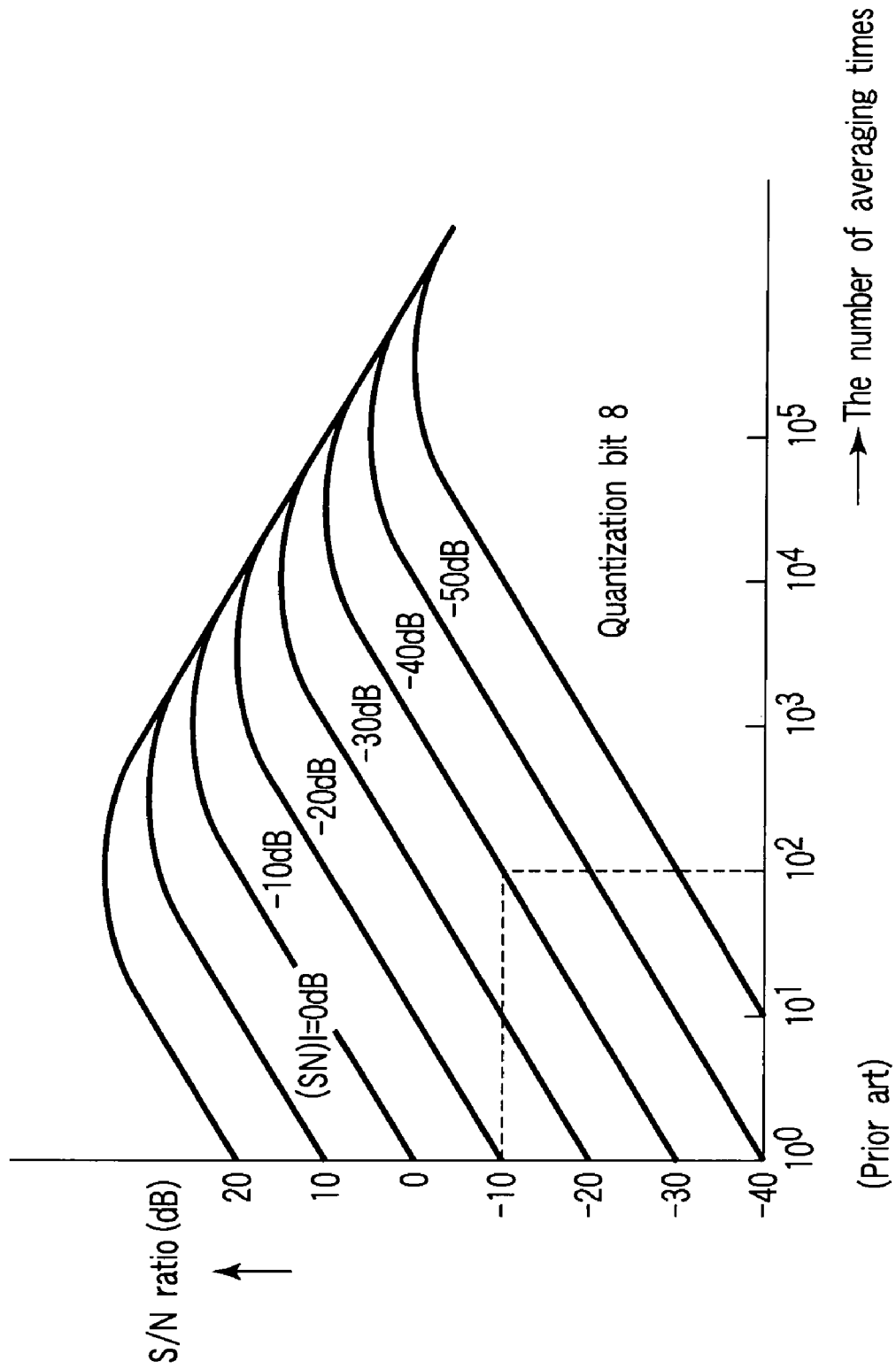
FIG. 10 is a diagram illustrating a relationship between the number of averaging times and an S/N ratio disclosed in Non-Patent Document 1.
Figure 11:
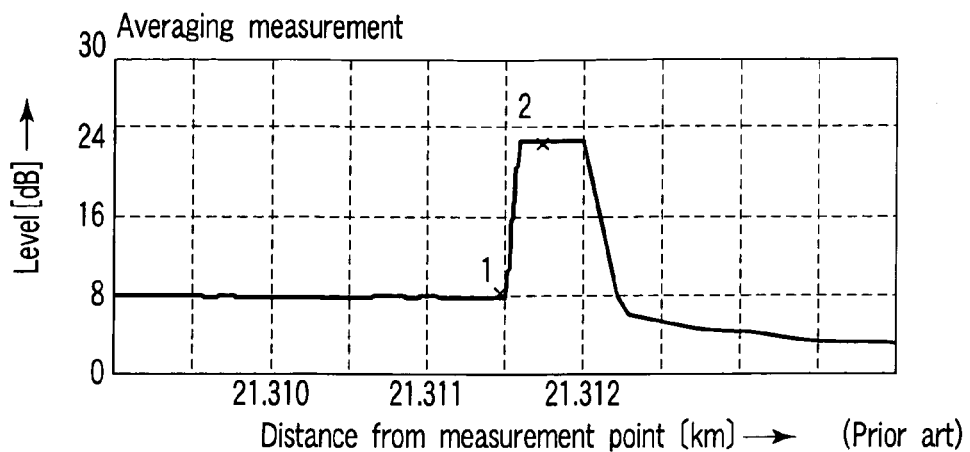
FIG. 11 is a diagram illustrating one example of a measurement waveform when reflection attenuation where a level difference is large is measured by averaging measurement using the conventional optical pulse tester (OTDR).
Figure 12:
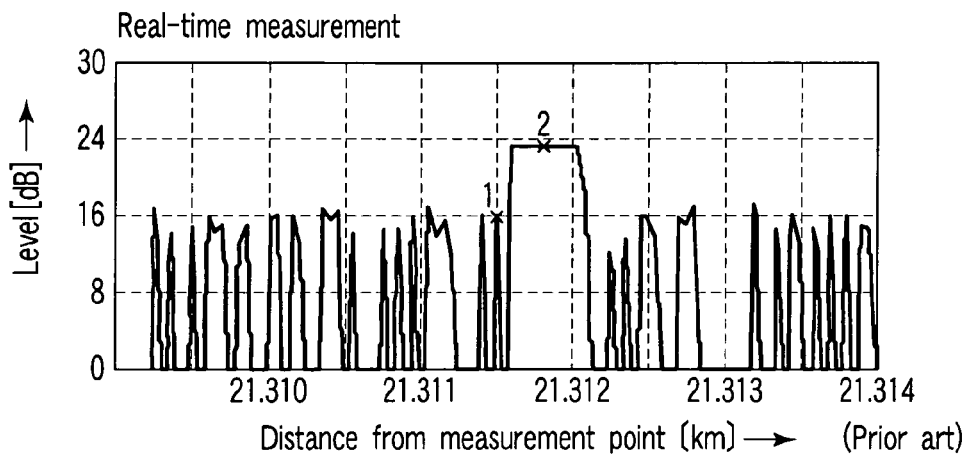
FIG. 12 is a diagram illustrating one example of a measurement waveform when an attenuator is moved to a peak position of Fresnel reflection in real-time measurement using the conventional optical pulse tester (OTDR).
Figure 13:
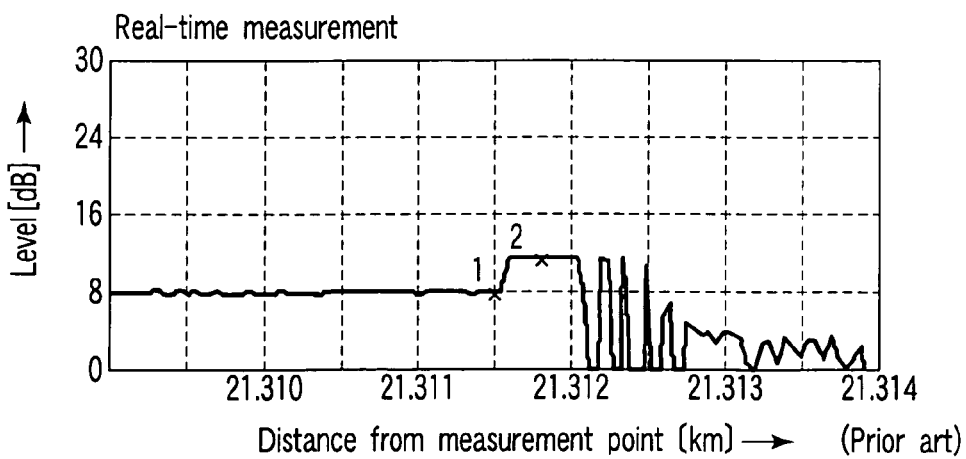
FIG. 13 is a diagram illustrating one example of a measurement waveform when the attenuator is moved to a position just before the Fresnel reflection in the real-time measurement using the conventional optical pulse tester (OTDR).

In order to realize the measurement level changing function, as shown in FIG. 1, the optical pulse tester (OTDR) 1 as the specific embodiment, to which the optical time domain reflectometer and the method for testing optical fiber using optical pulse of the present invention are applied, includes the marker specifying section 2, the control section 3, the waveform synthesizing section 4, the marker level acquiring section 5, the attenuator (ATT) value setting condition memory section 6, the attenuator (ATT) value setting condition calculating section 7, the level comparing section 8, the attenuator (ATT) value change determining section 9, the attenuator (ATT) value setting section 10, the level fluctuation detecting section 12, the measurement frequency setting section 13, the measurement frequency memory section 14, the waveform memory 62, the marker setting section 63 and an operating section 64 in addition to the timing generating section 52, the driving circuit 53, the light source 54, the optical directional coupler 55, the light receiver 56, the amplifying section 57, the signal-averaged processing section 58, the logarithmic converting section 59 and the display section 60 which form the basic configuration of the optical pulse tester (OTDR) 49 shown in FIG. 9.

In this case, the operating section 64 is loaded with operating members which relate to at least the marker setting section 63, the marker specifying section 2, the measurement frequency memory section 14 and an instruction for starting the real-time measurement, and the setting of a marker by the marker setting section 63, the specifying of a marker by the marker specifying section 2, the setting of the measurement frequency in the measurement frequency memory section 14, and the starting of the real-time measurement by the optical pulse tester (OTDR) 1 are instructed via the control section 3 according to the operations of the operating members as described later.

The control section 3 includes a CPU, a ROM and a RAM, and conducts the overall control of the optical pulse tester (OTDR) 1 including the automatic control for the real-time measurement, mentioned later, by the optical pulse tester (OTDR) 1 to which the present invention is applied.

In FIG. 1, the constitutional parts which are the same as those of the conventional optical pulse tester (OTDR) 49 shown in FIG. 9 are denoted by the same reference symbols, and the detailed description thereof is omitted.

In FIG. 1, as described above, the combination of the amplifying section 57 and the signal-averaged processing section 58 is expressed by the equivalent attenuator (ATT) 11, and the combination of the hard setting for obtaining the gain a and a frequency property of the amplifying section 57 and the average number of adding times m at which the addition is made by the signal-averaged processing section 58 is expressed by the attenuator (ATT) value.

Specifically, the optical pulse emitted from the light source 54 passes through the optical directional coupler 55, and is incident on the measured optical fiber 61.

The return light from the measured optical fiber 61 is transmitted to the light receiver 56 via the optical directional coupler 55, and is converted into an electric signal by the light receiver 56.

The electric signal converted by the light receiver 56 is amplified with the gain a by the amplifying section 57 in the attenuator (ATT) 11 whose attenuator (ATT) value is set, and the electric signal is converted into a digital signal by the A/D converter included in the signal-averaged processing section 58 so as to be averaged m times.

An output signal, which is added to be averaged m times by the signal-averaged processing section 58 of the attenuator (ATT) 11, is logarithmically converted by the logarithmic converting section 59, and is stored as waveform data, which is different for respective attenuator (ATT) values set in the attenuator (ATT) 11, into the waveform memory 62.

Waveforms of the waveform data stored for the respective attenuator (ATT) values in the waveform memory 62 are synthesized by the waveform synthesizing section 4 as the need arises, so as to be displayed as a measurement waveform on the screen of the display section 60.

The marker setting section 63 arbitrarily sets a marker on the measurement waveform displayed on the screen of the display section 60, and enables the set position of the marker to be moved.

In this case, the marker setting section 63 arbitrarily sets a marker on the measurement waveform displayed on the screen of the display section 60 via the control section 3 by the operating section 64 which is used for setting a marker by the operator.

When the plurality of markers are set on the measurement waveform, the marker specifying section 2 specifies a marker for measuring a waveform level from the plurality of markers set on the measurement waveform.

In this case, the marker specifying section 2 can specify a marker for the measurement of the waveform level from the plurality of markers arbitrarily set on the measurement waveform displayed on the screen of the display section 60 by the operating section 64, with which the operator specifies the marker, via the control section 3, and can specify a marker for the measurement of the waveform level automatically by means of the control section 3 based on the marker numbers i given to the plurality of markers as described later.

Figures 6, 7:
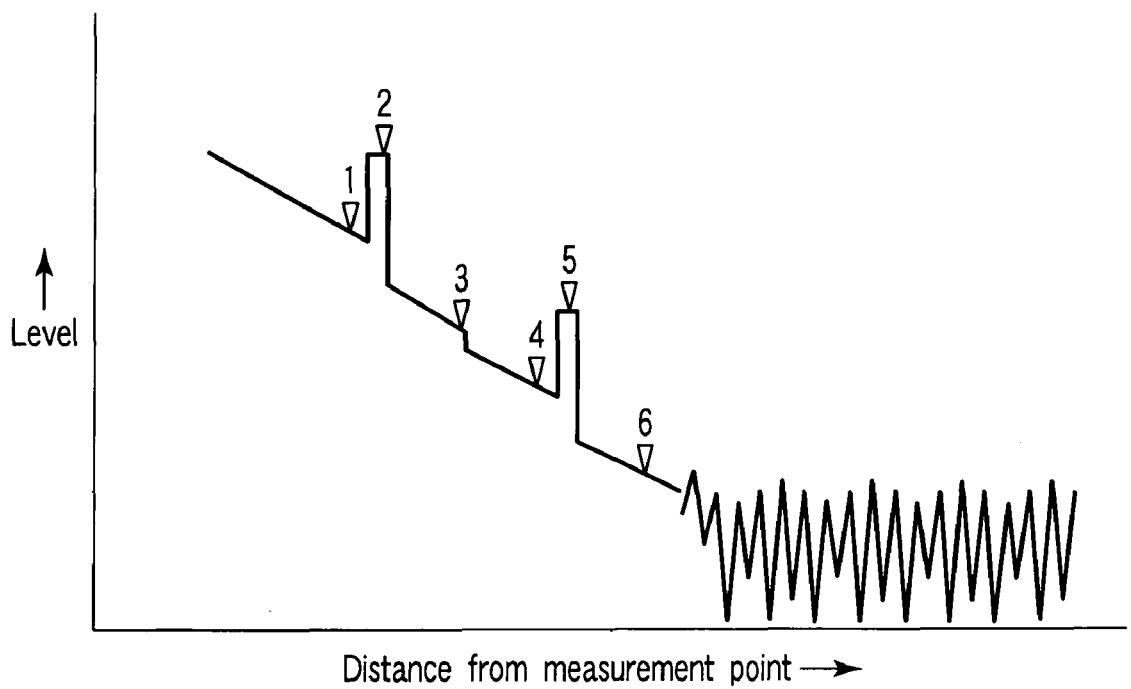
FIG. 6 is a diagram illustrating a display screen when a plurality of markers are set on a measurement waveform in the optical time domain reflectometer in FIG. 1.
FIG. 7 is a diagram illustrating one example of contents in an attenuator (ATT) value setting condition memory section in the optical time domain reflectometer in FIG. 1.

FIG. 6 is a diagram illustrating a measurement screen displaying the measurement waveform on which the markers are set.

In this example, the marker numbers i (i=1 to 6) are given to six markers displayed on the measurement waveform, respectively, with the marker set on the leftmost side on the measurement screen (the marker on the position which is the closest from the measurement point) denoted by 1.

The plurality of attenuator (ATT) value setting conditions for the real-time measurement which are preset correspondingly with the set positions of the plurality of markers set on the measurement waveform on the screen of the display screen 60 and are composed of the combinations of the gain a of the amplifying section 57 and the number of adding times m in the signal-averaged processing section 58 composing the equivalent attenuator (ATT) 11, and the effective measurement level ranges ΔLi preset for the respective attenuator (ATT) value setting conditions are stored in the attenuator (ATT) value setting condition memory section 6.

Specifically, as illustrated in FIG. 7, the attenuator (ATT) value setting condition memory section 6 has stored therein the combinations of the gain a of the amplifying section 57 and the number of averaging times m in the signal-averaged processing section 58 composing the attenuator (ATT) 11 which are set as the attenuator (ATT) values corresponding to the marker numbers i (i=1 to 6), and the effective measurement level ranges ΔLi (dBm) for the respective marker numbers i (i=1 to 6) preset for the respective combinations of the gain a and the number of averaging times m set as the attenuator (ATT) values.

In this case, for the marker 1, 200 is set as the gain a of the amplifying section 57, $2^8$ is set as the number of averaging times m in the signal-averaged processing section 58, and −25 to −45 are set as the effective measurement level range ΔLi (dBm).

For the marker 2, 100 is set as the gain a of the amplifying section 57, $2^8$ is set as the number of averaging times m in the signal-averaged processing section 58, and −10 to −30 are set as the effective measurement level range ΔLi (dBm).

For the marker 3, 300 is set as the gain a of the amplifying section 57, $2^8$ is set as the number of averaging times m in the signal-averaged processing section 58, and −40 to −60 are set as the effective measurement level range ΔLi (dBm).

For the marker 4, 400 is set as the gain a of the amplifying section 57, $2^8$ is set as the number of averaging times m in the signal-averaged processing section 58, and −55 to −75 are set as the effective measurement level range ΔLi (dBm).

For the marker 5, 300 is set as the gain a of the amplifying section 57, $2^8$ is set as the number of averaging times m in the signal-averaged processing section 58, and −40 to −60 are set as the effective measurement level range ΔLi (dBm).

For the marker 6, 500 is set as the gain a of the amplifying section 57, $2^{10}$ is set as the number of averaging times m in the signal-averaged processing section 58, and −70 to −90 are set as the effective measurement level range ΔLi (dBm).

That is to say, the numerical values, which are set as the effective measurement level ranges ΔLi (dBm) for the respective marker numbers i (i=1 to 6) preset for the combinations of the gain a and the number of averaging times m set as the attenuator (ATT) values of the marker numbers i (i=1 to 6) shown in FIG. 7, are set such that the set positions of the markers 1 to 6 are sequentially separated from the measurement point, and their waveform levels are sequentially lowered as shown in FIG. 6.

In this case, on the marker with the marker number 2 and the marker with the marker number 5, the levels of the measurement waveforms are higher than those on the markers adjacent to the markers 2 and 5. For this reason, after this point is taken into consideration, the numerical values are set.

The numerical values set for the respective markers can be distributed according to the level values of an ordinate axis and the distance values from the measurement point of an abscissa axis in FIG. 6.

With reference to FIG. 1, the attenuator (ATT) value setting section 10 sets the gain a of the amplifying section 57 and the number of averaging times m in the signal-averaged processing section 58 composing the attenuator (ATT) 11 based on the information about the combinations of the gain a and the number of averaging times m stored in the attenuator (ATT) value setting condition memory section 6 correspondingly with the marker numbers i specified by the marker specifying section 2.

Upon receiving the instruction from the marker specifying section 2, the marker level acquiring section 5 acquires the waveform levels of the marker numbers i selected by the marker specifying section 2 from the waveform data measured under the attenuator (ATT) value setting conditions corresponding to the marker numbers i and stored in the waveform memory 62.

The level comparing section 8 determines whether the waveform level of the marker of number i acquired by the marker level acquiring section 5 falls within the effective measurement level range ΔLi corresponding to the attenuator (ATT) value setting conditions currently set in the attenuator (ATT) 11 correspondingly with the marker of number i by means of level comparison.

The attenuator (ATT) value change determining section 9 determines whether the attenuator (ATT) value setting conditions currently set in the attenuator (ATT) 11 should be changed based on the determined result by means of the level comparison in the level comparing section 8.

In this case, when the level comparing section 8 determines that the acquired waveform level does not fall within the effective measurement level range ΔLi, the attenuator (ATT) value change determining section 9 determines that the attenuator (ATT) value setting conditions currently set in the attenuator (ATT) 11 should be changed.

When the attenuator (ATT) value change determining section 9 determines the attenuator (ATT) value setting conditions currently set in the attenuator (ATT) 11 should be changed, the attenuator (ATT) value setting condition change section 7 changes the attenuator (ATT) value setting conditions into new attenuator (ATT) value setting conditions such that the waveform level acquired by the marker level acquiring section 5 is included in the effective measurement level range ΔLi.

The new attenuator (ATT) value setting conditions changed by the attenuator (ATT) value setting condition change section 7 is updated to be stored in the attenuator (ATT) value set condition memory section 6, and the attenuator (ATT) value setting section 10 changes the attenuator (ATT) value setting conditions set in the attenuator (ATT) 11 corresponding to the marker i to be measured.

The attenuator (ATT) value setting condition change section 7 may calculate the S/N ratio based on the measurement waveform so as to acquire the effective measurement level range, as in the Patent Document 1.

Alternatively, the level at which the waveform is saturated at each attenuator (ATT) value is calculated, and from the calculated level to a level, at which the waveform is saturated at each attenuator (ATT) value at which waveform whose level is lower than the calculated level by one can be measured may compose the effective measurement level range.

Alternatively, the attenuator (ATT) value setting conditions (a and m) and the effective measurement level ranges acquired in advance by experiment or the like are stored in a memory such as the attenuator (ATT) value setting condition memory section 6, and the attenuator (ATT) value setting conditions may be selected from them.

In any case, the attenuator (ATT) values may be set so as to be partially overlapped on a boundary of the effective measurement level ranges, so that the attenuator (ATT) value setting conditions (a and m) are not frequently changed near the boundary of the effective measurement level ranges.

The measurement frequency memory section 14 stores the measurement frequency (Nimax) showing the number of continuous measuring times under the ATT value setting conditions corresponding to each marker of number i.

FIG. 8 is a diagram illustrating one example of stored contents in the measurement frequency memory section 14.

In FIG. 8, the marker numbers i show the marker numbers which are the same as the markers on the measurement waveform shown in FIG. 6.

A measuring operation by means of the measurement frequency in FIG. 8 will be described below.

The optical pulse tester (OTDR) 1 to which the present invention is applied takes the measurements and displays the results on the screen continuously two times under the attenuator (ATT) value setting conditions corresponding to the marker 1 according to the control of the control section 3. Thereafter, the OTDR 1 takes the measurements and displays the results on the screen continuously five times under the attenuator (ATT) value setting conditions corresponding to the marker 2, and then takes the measurement and displays the result on the screen only once under the attenuator (ATT) value setting conditions corresponding to the marker 3. Hereinafter, the measurement and the display on the screen are performed sequentially for the markers 4, 5 and 6 similarly.

The optical pulse tester (OTDR) 1 to which the present invention is applied repeats the measurement under the control of the control section 3 such that the measurements of the markers 1 to 6 form one cycle.

The level fluctuation detecting section 12 detects presence/absence of the waveform level of the marker acquired by the marker level acquiring section 5 by comparing this waveform level with the waveform level of the marker acquired at the previous measurement.

The measurement frequency setting section 13 increases or reduces the measurement frequency stored in the measurement frequency memory section 14 to an optimum number of times according to the presence/absence of the fluctuation in the waveform level of the marker detected by the level fluctuation detecting section 12.

In this case, when the fluctuation in the waveform level of the marker detected by the level fluctuation detecting section 12 is large, for example, the measurement frequency setting section 13 increases the measurement frequency stored in the measurement frequency memory section 14, and when the fluctuation is small, reduces the measurement frequency stored in the measurement frequency memory section 14.

Even as to the marker displayed on the measurement waveform, the measurement frequency stored in the measurement frequency memory section 14 is set to 0 according to a marker with number i on which the measurement is not required by an operator's instruction given via the operating section 64 and the control section 3. As a result, the waveform levels of necessary markers (for example, the markers which indicate two points whose level difference is measurement like the case where the Fresnel reflection, mentioned later, is measured in real time) can be measured in real time.

The waveform observation in the case where one marker set on the screen of the display section 60 is moved will be described below as a specific example of the measurement taken in the optical pulse tester (OTDR) 1 having the above configuration with reference to FIGS. 5A and 5B.

FIG. 5A illustrates a state in which the one marker is set on the position of the apex of the Fresnel reflection on the screen of the display section 60 by the marker setting section 63.

According to this state, as shown in FIG. 5B, a case where the marker is moved from the position of the apex of the Fresnel refection to a position of a bottom portion just before the Fresnel reflection by the marker setting section 63 is assumed.

In this case, in the optical pulse tester (OTDR) 1 to which the present invention is applied, the real-time measurement is taken under the optimum attenuator (ATT) value setting conditions corresponding to the position of the moved marker.

As a result, as shown in FIG. 5B, the measurement waveform where the S/N ratio on the portion corresponding to the moved marker position is improved to a value not less than the predetermined value is displayed.

Therefore, in the optical pulse tester (OTDR) 1 to which the present invention is applied, when the marker setting section 63 moves the marker set on the first position of the measurement waveform to the second position of the measurement waveform where the S/N ratio is not good, the attenuator (ATT) value setting conditions corresponding to the marker on the second position are set to optimum values so that the measurement is taken. As a result, the waveform on the second position can be observed with a good S/N ratio of not less than the predetermined value based on the waveform data displayed on the screen of the display section 60.

A waveform synthesizing example at the time when the Fresnel reflection is measured in real time by the optical pulse tester (OTDR) 1 according to the present invention will be described below with reference to FIGS. 5C, 5D and 5E.

Figure 5C:
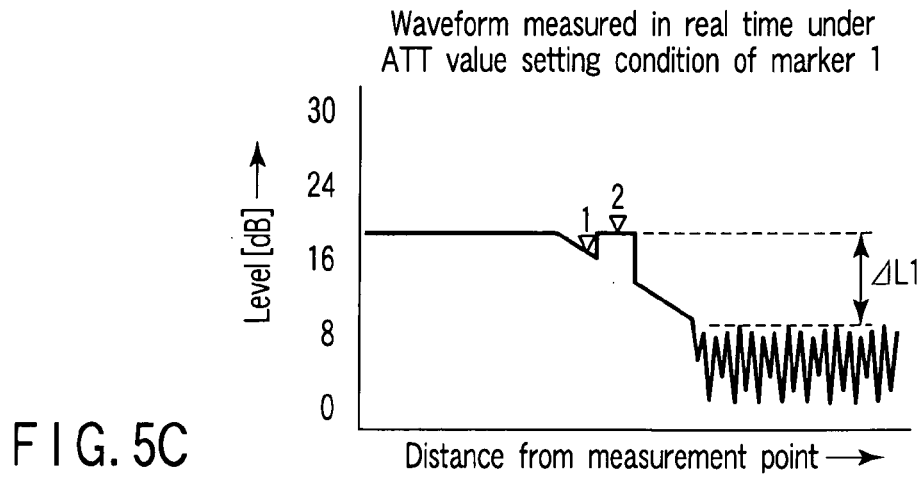
FIG. 5C is a diagram illustrating another example of the real-time measurement by means of the optical time domain reflectometer in FIG. 1.

FIG. 5C illustrates the measurement waveform which is measured in real time under the attenuator (ATT) value setting conditions corresponding to the marker 1.

Figure 5D:
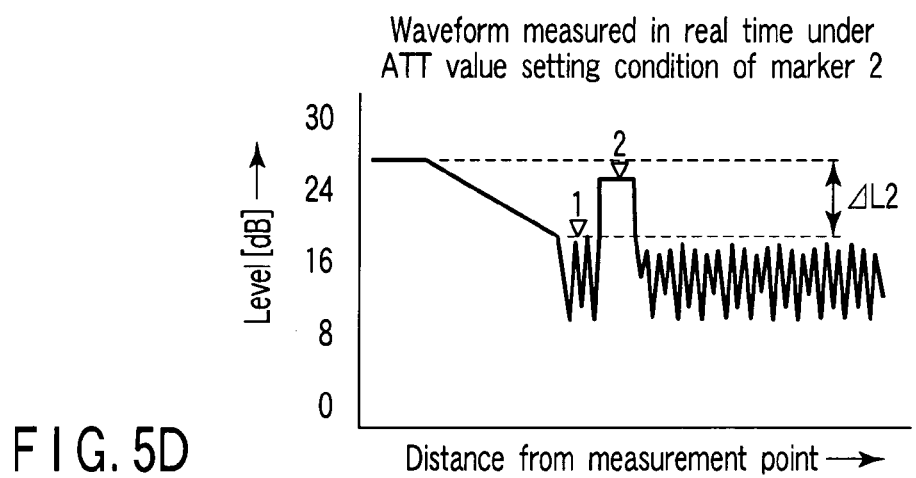
FIG. 5D is a diagram illustrating another example of the real-time measurement by means of the optical time domain reflectometer in FIG. 1.

FIG. 5D illustrates the measurement waveform which is measured in real time under the attenuator (ATT) value setting conditions corresponding to the marker 2.

Figure 5E:
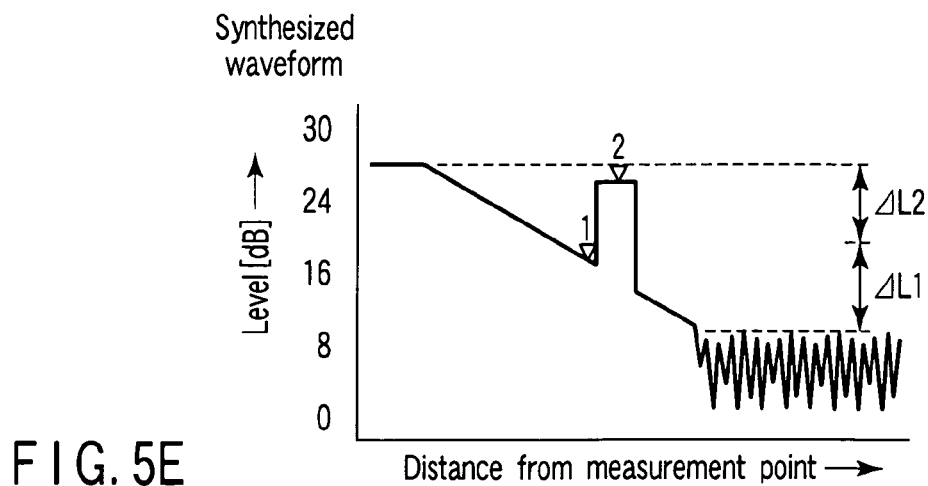
FIG. 5E is a diagram illustrating another example of the real-time measurement by means of the optical time domain reflectometer in FIG. 1.

FIG. 5E illustrates the measurement waveform which is obtained by synthesizing the waveform data within the effective measurement ranges in FIGS. 5C and 5D using the waveform synthesizing section 4 and is displayed on the screen of the display section 60.

On the measurement waveform shown in FIG. 5C, the level (marker 1) of the apex of the Fresnel reflection is saturated so that the measurement cannot be properly taken.

On the measurement waveform shown in FIG. 5D, the level (marker 2) of the bottom portion just before the Fresnel reflection is buried in noise so that the measurement cannot be properly taken.

On the contrary, on the synthesized measurement waveform shown in FIG. 5E, the Fresnel reflection (the level difference between the marker 1 and the marker 2) can be accurately measured.

In FIGS. 5C, 5D and 5E, $\Delta L1$ and $\Delta L2$ show the effective measurement ranges for convenience of understanding the waveform synthesizing, and they are not actually displayed on the screen of the display section 60 in the optical pulse tester (OTDR) 1.

In such waveform synthesizing, unlike the averaging measurement for an entire measurement range, attenuator (ATT) value setting conditions are set only for the essential minimum measurement ranges ($\Delta L1$ and $\Delta L2$), and the waveforms measured in real time are synthesized. For this reason, the waveforms whose level difference is large can be evaluated by the measurement which is approximately close to the real-time measurement.

Therefore, in the optical pulse tester (OTDR) 1 to which the present invention is applied, when the plurality of markers set on the measurement waveform by the marker setting section 63 include the first marker set on the position of the measurement waveform just before the Fresnel reflection and the second marker set on the position of the apex of the Fresnel reflection on the measurement waveform, the attenuator (ATT) value setting conditions corresponding to the first marker and the second marker are successively set so that the measurement is repeated. As a result, the waveform level just before the Fresnel reflection and level of the apex of the Fresnel reflection can be simultaneously observed with a good S/N ratio of not less than the predetermined value based on the synthesized waveform data displayed on the screen of the display section 60.

The operation of the optical pulse tester (OTDR) 1 having the above configuration will be described below with reference to FIGS. 2 to 4A, 4B and 4C.

In the optical pulse tester (OTDR) 1 having the above configuration, when the starting of the real-time measurement is instructed by the operator via the operating section 64, the real-time measurement is started as shown in FIG. 2 under the control of the control section 3.

For convenience of the description, prior to the starting of the real-time measurement, the plurality of markers (six markers with marker numbers i=1 to 6) are preset on the measurement waveform by the marker setting section 63, or the plurality of markers (six markers with marker numbers i=1 to 6) which are set at the time of the previous real-time measurement are set.

As a result, the plurality of attenuator (ATT) value setting conditions for the real-time measurement composed of the combination of the gain a of the amplifying section 57 and the number of adding times m in the signal-averaged processing section 58 composing the equivalent attenuator (ATT) 11, and the effective measurement level ranges $\Delta Li$ preset correspondingly with the plurality of attenuator (ATT) value setting conditions are stored in the attenuator (ATT) value setting condition memory section 6 correspondingly with the plurality of markers (six markers with marker numbers i=1 to 6) set on the measurement waveform by the marker setting section 63.

The control section 3 initializes the marker of number i into 1 via the marker specifying section 2 (step ST1).

When the marker of number i is changed automatically or is changed by the marker specifying section 2 via the operating section 64 (or the marker is moved by the marker setting section 63) (step ST2), as mentioned later, the control section 3 moves to a subroutine of the measurement process at which the measurement level is adjusted to the marker position of the marker i in FIG. 3 (marker position measuring process) (step ST3).

At the subroutine of the marker position measuring process shown in FIG. 3, the control section 3 allows the attenuator (ATT) value setting section 10 to set the attenuator (ATT) value setting conditions (the gain a of the amplifying section and the number of averaging times m) for the real-time measurement corresponding to the marker of number i stored in the attenuator (ATT) value setting condition memory section 6 into the attenuator (ATT) 11 according to the change in the marker of number i at step ST2 (step ST11).

The control section 3 allows the optical pulse tester (OTDR) 1 to take the real-time measurement and acquire the waveform data, so as to store the acquired waveform data about the marker of number i in the waveform memory 62 (step ST12).

The control section 3 then allows the marker level acquiring section 5 to acquire the waveform level on the marker position of the marker i stored in the waveform memory 62 (step ST13).

The control section 3 then allows the level comparing section 8 to compare the acquired waveform level with the effective measurement level range $\Delta Li$ of the marker i stored in the attenuator (ATT) value setting condition memory section 6 (step ST14).

When the level comparing section 8 determines that the acquired waveform level on the marker position of the marker i falls within the effective measurement level range (OK at step ST14), the control section 3 ends this subroutine, and moves to the change presence/absence determining process for the marker of number i in FIG. 2 (step ST4).

The change presence/absence determining process for the marker of number i (step ST4) is divided into subroutines as the change presence/absence determining process of the marker i, but this will be described later with reference to FIGS. 4A, 4B and 4C.

When the level comparing section 8 determines that the waveform level on the marker position of the marker does not fall within the effective measurement level range of the marker i (NG at step ST14), the control section 3 allows the attenuator (ATT) value setting condition changing section 7 to change the attenuator (ATT) value setting conditions into new attenuator (ATT) value setting conditions (the gain a of the amplifying section and the number of averaging times m) such that the waveform level falls within the effective measurement level range, stores this new attenuator (ATT) value setting conditions in the attenuator (ATT) value setting condition memory section 6 (step S16), and then ends this subroutine so as to move to the change presence/absence determining process for the marker of number i in FIG. 2 (step ST4).

When the determination is made that the change in the marker i is not necessary at the change presence/absence determining process for the marker of number i in FIG. 2 (step ST4) (NO at step ST4), the control section 3 reads the measurement waveforms for the marker numbers i stored in the waveform memory 62, and allows the waveform synthesizing section 4 to synthesizes the plurality of read measurement waveforms (step ST5).

The control section 3 cause to display the synthesized measurement waveform on the screen of the display section 60 (step ST6), and moves to the subroutine of the measuring process (marker position measuring process) at which the measurement level is adjusted to the marker position of the marker i (step ST3) so as to repeat the above process.

When the determination is made that the change in the marker i is necessary at step ST4 (Yes at step ST4), the control section 3 increments the marker of number i by 1 (i+1) (step ST7), and determines whether the incremented marker of number i exceeds the number of the markers (in this example, 6) set on the measurement waveform (step ST8).

When the determination is made at step ST8 that the incremented marker of number i exceeds the number of the set markers (Yes at step ST8), the control section 3 rewrites the marker of number i into 1 (step ST9), and then reads the measurement waveforms for the respective marker numbers i stored in the waveform memory 62 so as to allow the waveform synthesizing section 4 to synthesize the plurality of read measurement waveforms (step ST5).

The control section 3 displays the synthesized measurement waveform on the screen of the display section 60 (step ST6), and then moves to the subroutine of the measuring process (marker position measuring process) (step ST3) at which the measurement level is adjusted to the marker position of the marker i, so as to repeat the above process.

When the determination is made at step ST8 that the incremented marker of number i does not exceed the set number of the markers (No at step ST8), the control section 3 reads the measurement waveforms for the marker numbers i stored in the waveform memory 62, and allows the waveform synthesizing section 4 to synthesize the plurality of read measurement waveforms (step ST5).

The control section 3 cause to display the synthesized measurement waveform on the screen of the display section 60 (step ST6), and then moves to the subroutine of the measuring process (marker position measuring process) (step ST3) at which the measurement level is adjusted to the marker position of the marker i so as to repeat the above process.

The change presence/absence determining process for the marker of number i at step ST4 is divided into the following three cases.

(1) The case where the measurement waveforms are measured alternately in order of the marker numbers i (i=1, 2, 3 . . . ).

(2) The case where when the waveform level of any marker does no show the level fluctuation such that the attenuator (ATT) value setting condition needs to be changed, the marker of number i is sequentially changed and the measurement waveforms are measured alternately, and when the waveform level of any marker i shows the level fluctuation such that the attenuator (ATT) value setting condition needs to be changed, the waveform level of the marker i is continuously measured.

(3) The case where when the waveform level of any marker i does not show the level fluctuation such that the attenuator (ATT) value setting condition set in the attenuator needs to be changed, and the measurement frequency of the previously specified marker of number is raised so that the measurement is taken (the measurement is taken on the marker numbers other than the specified marker of number i at the rate of once per the number of measuring times on the specified marker of number i), and when the waveform level of any marker i shows the level fluctuation such that the attenuator (ATT) value setting condition needs to be changed, the measurement is continuously taken on the marker of number i.

Figure 4A:
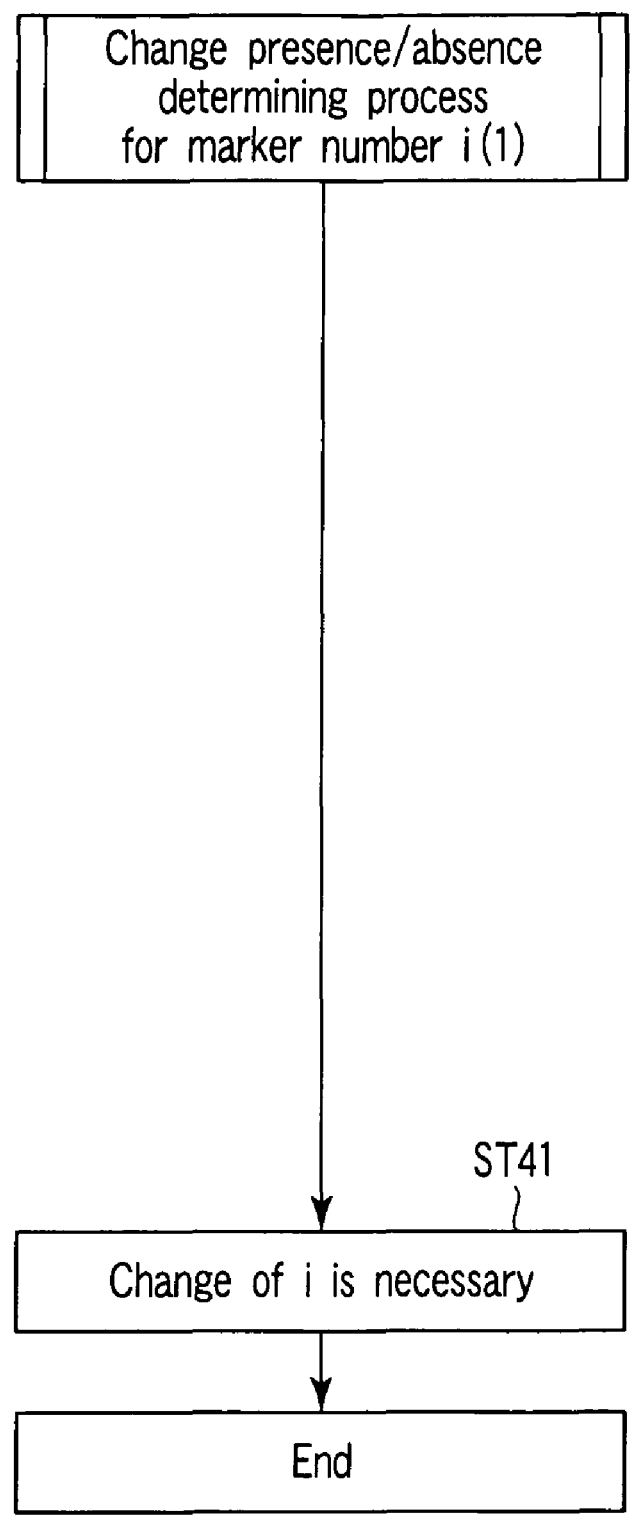
FIG. 4A is a flow chart illustrating one example of an operation of a change presence/absence determining process for marker numbers i in FIG. 2.
Figure 4B:
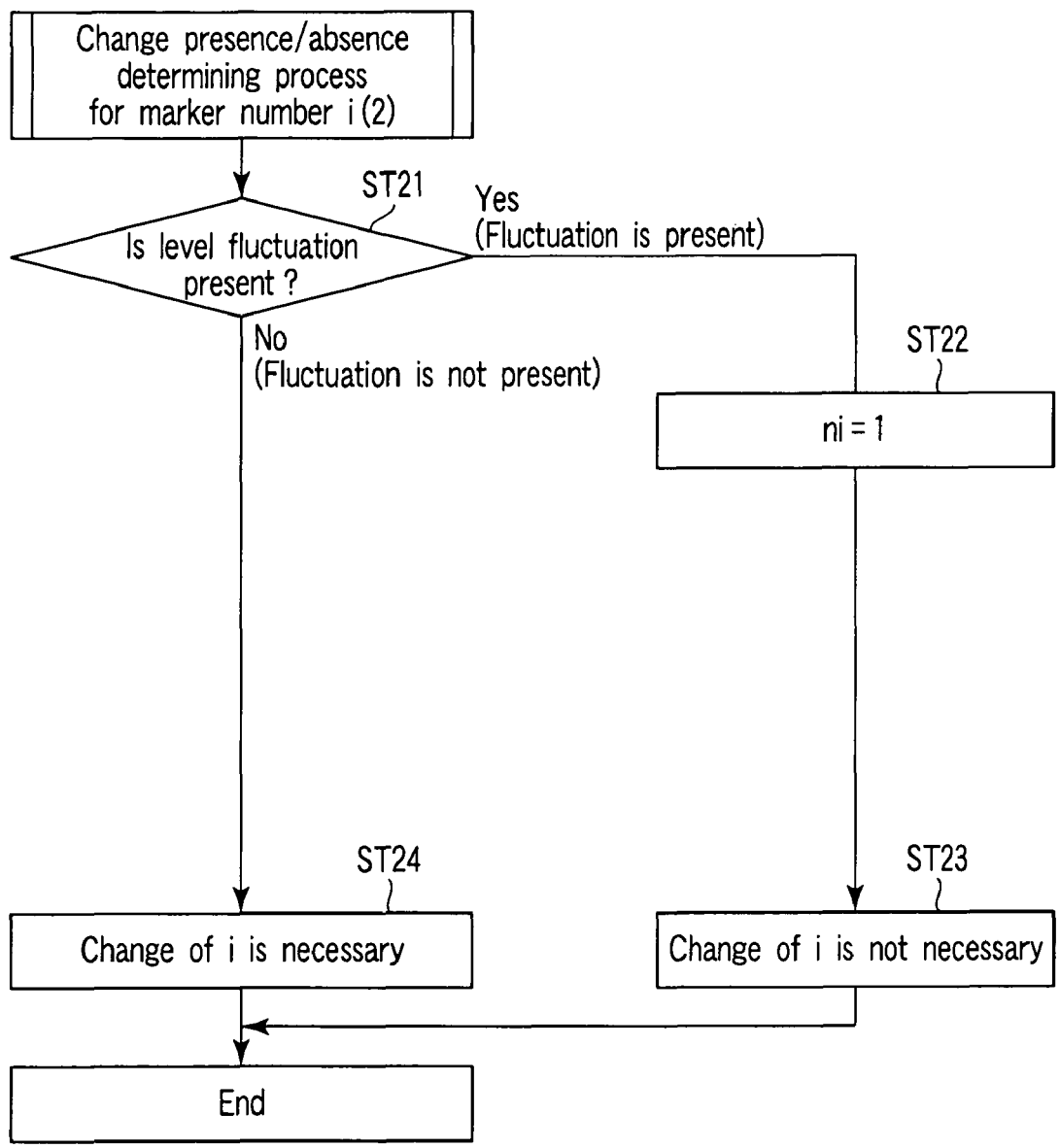
FIG. 4B is a flow chart illustrating another example of the operation of the change presence/absence determining process for the marker numbers i in FIG. 2.

Therefore, in the optical pulse tester (OTDR) 1 to which the present invention is applied, in order to enable a selective response to the cases (1) to (3), the change presence/absence determining process for the marker numbers i shown in FIGS. 4A, 4B and 4C can be selectively executed.

FIG. 4A is a flow chart illustrating the change presence/absence determining process for the marker of number i in the case (1).

That is to say, FIG. 4A illustrates the case where the marker of number i is automatically changed in order of the marker numbers i (i=1, 2, 3, . . . ) and measurement waveforms are alternately measured. For this reason, at the change presence/absence determining process for the marker of number i (step ST4), the control section 3 determines that the marker of number i needs to be changed immediately (step ST41), and ends the process.

FIG. 4B is a flow chart illustrating the change presence/absence determining process for the marker of number i in the case (2).

That is to say, FIG. 4B illustrates the case where when the waveform level of any marker does not show the level fluctuation such that the attenuator (ATT) value setting condition needs to be changed, the marker of number i is changed successively so that the waveforms are alternately measured, and when the waveform level of any marker i shows the level fluctuation such that the attenuator (ATT) value setting condition needs to be changed, the waveform on the marker of number i is continuously measured. For this reason, at the change presence/absence determining process (step ST4) for the marker of number i, the control section 3 firstly allows the level fluctuation detecting section 12 to determine whether the waveform level of the marker i acquired from the waveform memory 62 via the marker level acquiring section 5 fluctuates (step ST21).

When the level fluctuation detecting section 12 determines that the level fluctuation is present (Yes at step ST21), the control section 3 rewrites the measurement frequency (the number of measuring times) ni stored in the measurement frequency memory section 14 into 1 via the measurement frequency setting section 13 (step ST22), and then determines that the change of the marker i is not necessary (step ST23), so as to end the change presence/absence determining process for the marker of number i.

On the contrary, when the level fluctuation detecting section 12 determines that the waveform level of the marker i does not fluctuate (No at step ST21), the control section 3 determines that the change in the marker of number i is necessary (step ST24), so as to end the change presence/absence determining process for the marker of number i.

FIG. 4C is a flow chart illustrating the change presence/absence determining process for the marker of number i in the case (3).

That is to say, FIG. 4C illustrates the case where when the waveform level of any marker of number i does not show the level fluctuation such that the attenuator (ATT) value setting condition set in the attenuator needs to be changed, the measurement frequency of the previously specified marker of number i is raised so that the measurement is taken (the measurement is taken on the marker numbers other than the specified marker of number i at the rate of once per the number of measuring times on the specified marker of number i), and when the waveform level of any marker i shows the level fluctuation such that the attenuator (ATT) value setting condition needs to be changed, the measurement is continuously taken on the marker of number i. For this reason, at the change presence/absence determining process for the marker of number i (step ST4), the control section 3 allows the level fluctuation detecting section 12 to determine whether the waveform level of the marker of number i acquired from the waveform memory 62 via the marker level acquiring section 5 fluctuates (step ST31).

When the level fluctuation detecting section 12 determines that the level fluctuation is present (Yes at step ST13), the control section 3 rewrites the measurement frequency (the number of measuring times) ni stored in the measurement frequency memory section 14 into 1 via the measurement frequency setting section 13 (step ST32), and then determines that the change in the marker of number i is not necessary (step ST33), so as to end the change presence/absence determining process for the marker of number i.

On the contrary, when the level fluctuation detecting section 12 determines that the waveform level of the marker of number i does not fluctuate (No at step ST31), the control section 3 rewrites the measurement frequency (the number of measuring times) ni stored in the measurement frequency memory section 14 into ni+1 via the measurement frequency setting section 13 (step ST35), and determines whether the number of measuring times exceeds the measurement frequency Nimax (step ST36).

When the determination is made that the number of measuring times ni does not exceed the measurement frequency Nimax (No at step ST36), the control section 3 determines that the change in the marker of number i is not necessary (step ST32) so as to end the change presence/absence determining process for the marker of number i.

On the contrary, when the determination is made that the number of measuring times ni exceeds the measurement frequency Nimax (Yes at step ST36), the control section 3 rewrites the measurement frequency (the number of measuring times) ni stored in the measurement frequency memory section 14 into 1 via the measurement frequency setting section 13 (step ST37), and then determines that the change in the marker of number i is necessary (step ST34) so as to end the change presence/absence determining process for the marker of number i.

The measurement frequency Nimax is set for each marker of number i so as to be stored in the measurement frequency memory section 14 as shown in FIG. 8.

The measurement frequency Nimax can be set as any value in the measurement frequency memory section 14 via the control section 3 in such a manner that the operator operates a corresponding operating member of the operating section 64.

In order to intensively monitor the marker of number i whose level fluctuates, the measurement frequency Nimax can be set automatically by the control section 3 so that the measurement frequency Nimax is temporarily raised.

In the example of FIG. 8, in order to intensively measure the level fluctuation of the Fresnel reflection, the measurement frequency Nimax of the marker of number i (i=1, 2, 4, 5) near the apex of the Fresnel reflection is set so as to be larger than that of the other marker numbers.

When the determination is made that the change in the marker of number i is not necessary at the change presence/absence determining process for the marker of number i, the control section 3 goes to the process at step ST5 in FIG. 2.

On the contrary, when the determination is made that the change in the marker number i is necessary, the control section 3 goes to the process at step ST7 in FIG. 2 (rewrite the marker number i into i+1).

In the optical pulse tester (OTDR) 1, to which the optical time domain reflectometer and the method for testing optical fiber using an optical pulse according to one embodiment of the present invention are applied, in the real-time measurement, when the measurement position is specified by the marker of number i, the determination is made as to whether the waveform level of the marker of number i falls within the effective measurement level range of currently selected attenuator (ATT) value setting conditions, and when the waveform level does not fall within the effective measurement level range, optimum attenuator (ATT) value setting conditions within the effective measurement level range are automatically set, so that the waveform can be observed with a good S/N ratio of not less than the predetermined value.

In the optical pulse tester (OTDR) of the present invention, in the real-time measurement, optimum attenuator (ATT) values are set automatically correspondingly with the waveform levels where the plurality of markers set on the waveform are positioned in respective measurements, and the measurement waveforms are synthesized to be displayed.

In the optical pulse tester (OTDR) 1 of the present invention, the measurement frequencies of the plurality of markers can be independently varied automatically according to the fluctuation in the waveform levels of the markers or based on the setting by the operator, so that the measurement frequencies are varied among the markers.

As a result, in the optical pulse tester (OTDR) 1 of the present invention, in the real-time measurement, when the plurality of (at least two) markers are set, the optimum attenuator values are automatically selected to be set in cooperation with the markers so that the measurement levels are changed. For this reason, the waveforms can be observed with a good S/N ratio of not less than the predetermined value over a wide range.

In the optical pulse tester (OTDR) 1 of the present invention, particularly the waveform level just before the Fresnel reflection and the level of the apex of the Fresnel reflection can be simultaneously observed with a good S/N ratio of not less than the predetermined value, and thus the change in the reflection attenuation can be observed in approximately real time.

As a result, the reflection attenuation where the level difference of objects to be measured is large can be easily measured in real time.

Further, in the optical pulse tester (OTDR) 1 of the present invention, the attenuator values (gain and the number of averaging times) do not have to be suitably adjusted manually according to the levels of the measurement waveforms, and the operator only has to move the marker on the display screen to a target position so that the waveform on the desired position can be observed with a good S/N ratio of not less than the predetermined value.

In the optical pulse tester (OTDR) 1 of the present invention, the measurement frequencies of the plurality of markers are independently varied according to the fluctuation in the waveform levels of the markers so that the measurement frequencies are made to be varied among the markers. As a result, even at the time of the measurement of the attenuation of the reflection such as Fresnel reflection where the level difference is large, the measurement frequency of the marker with level fluctuation is temporarily raised, so that the real-time measurement which quickly responds to the change in measurement waveforms can be realized.

It goes without saying that the present invention is not limited to the above illustrated embodiment, and various modifications can be applied to the present invention without departing from the gist of the present invention.

For example, like the optical pulse tester (OTDR) 1 according to the above-illustrated embodiment, in the real-time measurement, the measurement is not taken a plural number of times by temporally switching the plurality of attenuator (ATT) value setting conditions, but the measurement is taken once simultaneously by setting the plurality of attenuators (ATT) whose attenuator (ATT) value setting conditions are set respectively. As a result, the optical pulse tester (OTDR) 1 having the measurement level changing function can be realized.

The markers set on the measurement waveform displayed on the screen of the display section are not limited to arrow-shaped markers shown in the drawings, and markers having any shape, including linear markers crossing the measurement waveform in a vertical direction, can be suitably adopted.

Therefore, as described in detail above, according to the present invention, it can be provided an optical time domain reflectometer which, in the real-time measurement, sets the attenuator (ATT) values to optimum values based on the result of determining whether the waveform levels of the markers as the measurement position specifying means displayed on the display section fall within the preset effective measurement level ranges, measures the measured optical fiber so as to enable the waveforms on the desired positions to be observed with a good S/N ratio of not less than the predetermined value simply by moving the markers to target positions, and automatically tracks the level fluctuation due to the change in the state of the measured optical fiber so as to enable even the reflection attenuation where the level difference of the measurement waveforms is large to be easily measured, and the method for testing optical fiber using an optical pulse.

INDUSTRIAL APPLICABILITY

In the optical time domain reflectometer and the method for testing optical fiber using an optical pulse according to the present invention, in the real-time measurement, the attenuator (ATT) values are set to optimum values based on the result of determining whether the waveform level of the marker as the measurement position specifying means displayed on the display section falls within the preset effective measurement level range, and the measured optical fiber is measured so that the waveform observation on the desired position is enabled with a good S/N ratio of not less than the predetermined value merely by moving the marker to a target position, and even the reflection attenuation where the level difference of the measurement waveform is large can be easily measured automatically according to the level fluctuation due to the change in the state of the measured optical fiber. For this reason, the present invention is suitable for measurement in observing the condition and the change of a measured optical fiber, and can be used particularly for applications requiring readiness in laying of the optical fiber, like the case where while the optical fiber is being connected by a connector or fusing, the connected state of the optical fiber is checked for good/bad condition.

The invention claimed is:

1. An optical time domain reflectometer comprising:
a light source which emits an optical pulse to be incident on a measured optical fiber;
a light receiver which receives backscattered light returned from the measured optical fiber according to the optical pulse emitted from the light source;
an equivalent attenuator comprising an amplifying section which amplifies an output signal from the light receiver with a predetermined gain, and a signal-averaged processing section which adds output signals amplified by the amplifying section a predetermined number of times so as to average the output signals;
a logarithmic converting section which logarithmically converts an averaged output signal from the equivalent attenuator;
a waveform memory which stores therein the averaged output signal from the logarithmic converting section as waveform data;
a display which reads the waveform data stored in the waveform memory so as to display the waveform data as a measurement waveform on a screen;
a marker setting section which sets markers arbitrarily on the measurement waveform displayed on the screen of the display and enables set positions of the markers to be moved;
an attenuator value setting condition memory section which stores therein a plurality of attenuator value setting conditions for real-time measurement which are preset correspondingly to the set positions of the markers set on the measurement waveform on the screen of the display by the marker setting section and which comprise combinations of a gain of the amplifying section and a number of adding times in the signal-averaged processing section which comprise the equivalent attenuator, and effective measurement level ranges which are preset for the plurality of attenuator value setting conditions;
a marker level acquiring section which acquires waveform levels on the set positions of the markers movable on the measurement waveform displayed on the screen of the display by the marker setting section from the waveform data stored in the waveform memory;
a level comparing section which determines whether or not the waveform levels on the marker set positions acquired by the marker level acquiring section fall within the effective measurement level ranges stored in the attenuator value setting condition memory section;
an attenuator value change determining section which, when the level comparing section determines that the waveform levels of the marker set positions acquired by the marker level acquiring section do not fall within the effective measurement level ranges stored in the attenuator value setting condition memory section, determines a change in the attenuator value setting conditions;
an attenuator value setting condition changing section which changes the attenuator value setting conditions stored in the attenuator value setting condition memory section into new attenuator value setting conditions where the waveform levels on the marker set positions acquired by the marker level acquiring section fall within the effective measurement level ranges upon the determination of the change in the attenuator value setting conditions from the attenuator value change determining section;
an attenuator value setting section which sets one of unchanged attenuator value setting conditions stored in the attenuator value setting condition memory section, and changed new attenuator value setting conditions in the equivalent attenuator; and
a control section comprising a CPU which controls the measured optical fiber to be measured based on the attenuator value setting conditions set in the equivalent attenuator by the attenuator value setting section, reads the waveform data stored in the waveform memory, and successively displays the waveform data on the screen of the display so as to enable real-time measurement in which the measurement waveform displayed on the screen of the display is successively updated,
wherein the attenuator value setting conditions to be set for the equivalent attenuator are set to optimum values based on a result of determining whether or not the waveform levels of the markers set on the screen of the display by the marker setting section fall within the preset effective measurement level ranges and the measured optical fiber is measured, and waveforms on desired positions can be observed with a signal-to-noise ratio (S/N ratio) of not less than a predetermined value based on the measurement waveform displayed on the screen of the display by moving the markers to target positions by the marker setting section, and
wherein operations of the sections comprising the optical time domain reflectometer are performed under control of the CPU.

2. The optical time domain reflectometer according to claim 1, wherein when a marker set on a first position on the measurement waveform on the screen of the display by the marker setting section is moved to a second position on the measurement waveform with a S/N ratio of not more than the predetermined value, the attenuator value setting condition corresponding to the marker on the second position is set to an optimum value and the measured optical fiber is measured, so that the measured waveform on the second position can be observed with a S/N ratio of not less than the predetermined value based on the measurement waveform displayed on the screen of the display.

3. The optical time domain reflectometer according to claim 1, further comprising:
a marker specifying section which specifies a marker to be measured from the plurality of markers when the plurality of markers are arbitrarily set on the measurement waveform on the screen of the display by the marker setting section, wherein the attenuator value setting condition memory section has stored therein (i) a plurality of attenuator value setting conditions for real-time measurement which are preset correspondingly to the set positions of the plurality of markers set on the measurement waveform on the screen of the display by the marker setting section and which comprise the combinations of the gain of the amplifying section and the number of adding times in the signal-averaged processing section which comprise the equivalent attenuator, and (ii) effective measurement level ranges which are preset for the plurality of attenuator value setting conditions, the marker level acquiring section acquires a waveform level on the set position of the marker to be measured, which is specified by the marker specifying section from the plurality of markers set on the measurement waveform on the screen of the display by the marker setting section, from the waveform data stored in the waveform memory, the level comparing section determines whether or not the waveform level on the set position of the marker to be measured acquired by the marker level acquiring section falls within the effective measurement level range which is stored in the attenuator value setting condition memory section and corresponds to the set position of the marker to be measured, the attenuator value change determining section determines a change in the attenuator value setting conditions when the level comparing section determines that the waveform level of the set position of the marker to be measured does not fall within the effective measurement level range which is stored in the attenuator value setting condition memory section and corresponds to the marker to be measured, the attenuator value setting condition changing section changes the attenuator value setting condition stored in the attenuator value setting condition memory section into new attenuator value setting conditions where the waveform level on the set position of the marker to be measured acquired by the marker level acquiring section falls within the effective measurement level range upon the determination of the change in the attenuator value change determining section, the attenuator value setting section sets unchanged attenuator value setting conditions stored in the attenuator value setting condition memory section or changed new attenuator value setting conditions correspondingly with the marker to be measured, in the equivalent attenuator, the control section controls the measured optical fiber to be measured based on the attenuator value setting conditions set in the equivalent attenuator by the attenuator value setting section correspondingly with the marker to be measured, reads the waveform data stored in the waveform memory correspondingly with the marker to be measured, and successively displays the waveform data on the screen of the display so as to enable real-time measurement in which the measurement waveform displayed on the screen of the display is successively updated, the optical time domain reflectometer further comprising:

a waveform synthesizing section which reads the waveform data corresponding to the marker to be measured acquired by the measurement based on the attenuator value setting conditions set in the equivalent attenuator by the attenuator value setting section correspondingly with the marker to be measured and synthesizes the waveform data so as to display the synthesized waveform data on the screen of the display, and the attenuator value setting conditions set in the equivalent attenuator are sequentially set to optimum values correspondingly with the plurality of markers based on the result of determining whether or not the waveform levels of the markers set on the screen of the display by the marker setting section fall within the preset effective measurement level ranges, and the measured optical fiber is repeatedly measured, so that waveforms on desired positions can be measured over a predetermined range with a S/N ratio of not less than the predetermined value based on a measurement waveform of the synthesized waveform data displayed on the screen of the display, and reflection attenuation having a predetermined level difference of the measurement waveform can be measured by automatically tracking a level fluctuation due to a change in a state of the measured optical fiber.

4. The optical time domain reflectometer according to claim 3, wherein when the plurality of markers set on the measurement waveform on the screen of the display by the marker setting section include a first marker set on a position before Fresnel reflection on the measurement waveform and a second marker set on a position of an apex of the Fresnel reflection on the measurement waveform, the attenuator value setting conditions corresponding to the first marker and the second marker are set sequentially and the measured optical fiber is repeatedly measured, so that a waveform level before the Fresnel reflection and a level of the apex of the Fresnel reflection can be simultaneously observed with a S/N ratio of not less than the predetermined value based on the measurement waveform of the synthesized waveform data displayed on the screen of the display.

5. The optical time domain reflectometer according to claim 3, further comprising:

a measurement frequency memory section which stores a measurement frequency showing a number of continuous and repeated measuring times for each of the plurality of markers, wherein the marker to be measured is measured repeatedly under the attenuator value setting condition corresponding to the marker to be measured based on the measurement frequency corresponding to the marker to be measured stored in the measurement frequency memory section, and then subsequent markers to be measured are repeatedly measured under the attenuator value setting condition corresponding to the subsequent markers to be measured based on the measurement frequency corresponding to the subsequent markers to be measured stored in the measurement frequency memory section.

6. The optical time domain reflectometer according to claim 5, further comprising:

a level fluctuation detecting section which detects a fluctuation in the waveform level corresponding to the marker to be measured acquired by the marker level acquiring section; and a measurement frequency setting section which changes the measurement frequency corresponding to the marker stored in the measurement frequency memory section according to presence/absence of the fluctuation in the waveform level corresponding to the marker to be measured detected by the level fluctuation detecting section.

7. The optical time domain reflectometer according to claim 5, wherein the waveform synthesizing section selects only waveform data about a waveform level included in the effective measurement level range corresponding to the marker to be measured from waveform data acquired by the repeated measurement so as to synthesize the waveform data.

8. A method for testing optical fiber using an optical pulse, the method comprising:

a step of emitting an optical pulse to be incident on a measured optical fiber;

a step of receiving backscattered light returned from the measured optical fiber so as to convert the backscattered light into an electric signal;

a step of amplifying the electric signal with a predetermined gain by an amplifying section;

a step of adding output signals amplified by the amplifying section a predetermined number of times by a signal-averaged processing section which comprises an equivalent attenuator together with the amplifying section so as to average the added signals;

a step of logarithmically converting an averaged output signal from the equivalent attenuator by a logarithmic converting section;

a step of storing the averaged output signal from the logarithmic converting section as waveform data in a waveform memory;

a step of reading the waveform data stored in the waveform memory so as to display the waveform data as a measurement waveform on a screen of a display;

a step of setting markers arbitrarily on the measurement waveform displayed on the screen of the display movably;

a step of storing a plurality of attenuator value setting conditions for real-time measurement which are preset correspondingly with set positions of the markers set on the measurement waveform on the screen of the display and which comprise combinations of a gain of the amplifying section and a number of adding times in the signal-averaged processing section comprising the equivalent attenuator, and effective measurement level ranges which are preset for the plurality of attenuator value setting conditions, in an attenuator value setting condition memory section;

a step of acquiring waveform levels on the set positions of the markers set arbitrarily on the measurement waveform displayed on the screen of the display from the waveform data stored in the waveform memory;

a step of determining whether or not the waveform levels on the marker set positions acquired from the waveform data stored in the waveform memory fall within the effective measurement level ranges stored in the attenuator value setting condition memory section;

a step of, when the determination is made that the waveform levels of the marker set positions do not fall within the effective measurement level ranges stored in the attenuator value setting condition memory section, determining a change in the attenuator value setting conditions;

a step of changing the attenuator value setting conditions stored in the attenuator value setting condition memory section into new attenuator value setting conditions where the waveform levels on the marker set positions fall within the effective measurement level ranges upon the determination of the change in the attenuator value setting conditions;

a step of setting unchanged attenuator value setting conditions stored in the attenuator value setting condition memory section or changed new attenuator value setting conditions in the equivalent attenuator; and a step of allowing the measured optical fiber to be measured based on the attenuator value setting conditions set in the equivalent attenuator and displaying the waveform data stored in the waveform memory successively on the screen of the display so as to enable real-time measurement in which the measurement waveform displayed on the screen of the display is successively updated, wherein the attenuator value setting conditions to be set on the equivalent attenuator are set to optimum values based on a result of determining whether or not the waveform levels of the markers set on the screen of the display fall within the preset effective measurement level ranges and the measured optical fiber is measured, so that a waveform on a desired position can be observed with a S/N ratio of not less than a predetermined value based on the measurement waveform displayed on the screen of the display by moving the markers to target positions.

9. The method for testing optical fiber using an optical pulse according to claim 8, wherein when a marker set on a first position on the measurement waveform on the screen of the display is moved to a second position on the measurement waveform with a S/N ratio of not more than the predetermined value, the attenuator value setting conditions corresponding to the marker on the second position are set to optimum values and the measured optical fiber is measured, so that the measured waveform on the second position can be observed with a S/N ratio of not less than the predetermined value based on the measurement waveform displayed on the screen of the display.

10. The method for testing optical fiber using an optical pulse according to claim 8, further comprising:

a step of specifying a marker to be measured from the plurality of markers when the plurality of markers are arbitrarily set on the measurement waveform displayed on the screen of the display, wherein the attenuator value setting condition memory section has stored therein a plurality of attenuator value setting conditions for the real-time measurement which are preset correspondingly with the set positions of the plurality of markers set on the measurement waveform on the screen of the display and which comprise the combinations of the gain of the amplifying section and the number of adding times in the signal-averaged processing section which comprise the equivalent attenuator, and effective measurement level ranges which are preset for the plurality of attenuator value setting conditions, at the step of acquiring waveform levels on the set position of the markers, a waveform level corresponding to a set position of the marker to be measured in the plurality of markers set on the measurement waveform on the screen of the display is acquired from the waveform data stored in the waveform memory, at the step of determining whether or not the waveform levels on the marker set positions fall within the effective measurement level ranges, the determination is made as to whether or not the waveform level on the set position of the marker to be measured falls within the effective measurement level range stored in the attenuator value setting condition memory section, and corresponding to the marker to be measured, at the step of determining the change in the attenuator value setting conditions, when the determination is made that the waveform level on the set position of the marker to be measured does not fall within the effective measurement level range corresponding to the marker to be measured stored in the attenuator value setting condition memory section, the change in the attenuator value setting conditions is determined, at the step of changing the attenuator value setting condition, the attenuator value setting conditions stored in the attenuator value setting condition memory section are changed into new attenuator value setting conditions where the waveform level on the set position of the marker to be measured falls within the effective measurement level range upon the determination of the change of the attenuator value setting conditions, at the step of setting in the equivalent attenuator, unchanged attenuator value setting conditions stored in the attenuator value setting condition memory section or changed new attenuator value setting conditions are set in the equivalent attenuator correspondingly with the marker to be measured, at the step of enabling the real-time measurement, the measured optical fiber is measured based on the attenuator value setting conditions set in the equivalent attenuator correspondingly with the marker to be measured, and the waveform data stored in the waveform memory correspondingly with the marker to be measured is read and is successively displayed on the screen of the display so that the real-time measurement in which the measurement waveform displayed on the screen of the display is successively updated is enabled, the method further comprising:

a step of reading the waveform data corresponding to the marker to be measured acquired by the measurement based on the attenuator value setting conditions set in the equivalent attenuator by the attenuator value setting section correspondingly to the marker to be measured from the waveform memory and synthesizing the waveform data so as to display the synthesized waveform data on the screen of the display, and the attenuator value setting conditions set in the equivalent attenuator are sequentially set to optimum values correspondingly with the plurality of markers based on the result of determining whether or not the waveform levels of the markers displayed on the screen of the display fall within the preset effective measurement level ranges, and the measured optical fiber is repeatedly measured, so that waveforms on desired positions can be observed over a predetermined range with a S/N ratio of not less than the predetermined value based on the measurement waveform of the synthesized waveform data displayed on the screen of the display, and reflection attenuation having a predetermined level difference of the measurement waveform can be measured by automatically tracking a level fluctuation due to a change in a state of the measured optical fiber.

11. The method for testing optical fiber using optical pulse according to claim 10, wherein when the plurality of markers set on the measurement waveform on the screen of the display include a first marker set on a position before Fresnel reflection on the measurement waveform and a second marker set on a position of an apex of the Fresnel reflection on the measurement waveform, the attenuator value setting conditions corresponding to the first marker and the second marker are set sequentially and the measured optical fiber is repeatedly measured, so that a waveform level before the Fresnel reflection and a level of the apex of the Fresnel reflection can be simultaneously observed with a S/N ratio of not less than the predetermined value based on the measurement waveform of the synthesized waveform data displayed on the screen of the display.

12. The method for testing optical fiber using an optical pulse according to claim 10, further comprising:

a step of storing a measurement frequency showing a number of continuous and repeated measuring times for each of the plurality of markers in a measurement frequency memory section, wherein the marker to be measured is measured repeatedly under the attenuator value setting condition corresponding to the marker to be measured based on the measurement frequency corresponding to the marker to be measured stored in the measurement frequency memory section, and subsequent markers to be measured are repeatedly measured under the attenuator value setting condition corresponding to the subsequent markers to be measured based on the measurement frequency corresponding to the subsequent markers to be measured stored in the measurement frequency memory section.

13. The method for testing optical fiber using an optical pulse according to claim 12, further comprising:

a step of detecting a fluctuation in the waveform level corresponding to the marker to be measured; and a step of changing the measurement frequency corresponding to the marker stored in the measurement frequency memory section according to presence/absence of the fluctuation in the waveform level corresponding to the marker to be measured.

14. The method for testing optical fiber using an optical pulse according to claim 12, wherein at the step of displaying the synthesized waveform data on the screen of the display, only waveform data about a waveform level included in the effective measurement level range corresponding to the marker to be measured is selected from waveform data acquired by the repeated measurement so that the waveform data are synthesized.

15. An optical time domain reflectometer comprising:

a light source which emits an optical pulse to be incident on a measured optical fiber;

a light receiver which receives backscattered light returned from the measured optical fiber according to the optical pulse emitted from the light source;

an equivalent attenuator comprising an amplifying section which amplifies an output signal from the light receiver with a predetermined gain, and a signal-averaged processing section which adds output signals amplified by the amplifying section a predetermined number of times so as to average the output signals;

a logarithmic converting section which logarithmically converts an averaged output signal from the equivalent attenuator;

a waveform memory which stores therein the averaged output signal from the logarithmic converting section as waveform data;

a display which reads the waveform data stored in the waveform memory so as to display the waveform data as a measurement waveform on a screen;

a marker setting section which sets markers arbitrarily on the measurement waveform displayed on the screen of the display and enables set positions of the markers to be moved;

a marker specifying section which specifies a marker to be measured from the plurality of markers when the plurality of markers are arbitrarily set on the measurement waveform on the screen of the display by the marker setting section;

an attenuator value setting condition memory section which stores therein a plurality of attenuator value setting conditions for real-time measurement which are preset correspondingly to the set positions of the markers set on the measurement waveform on the screen of the display by the marker setting section and which comprise combinations of a gain of the amplifying section and a number of adding times in the signal-averaged processing section which comprise the equivalent attenuator, and effective measurement level ranges which are preset for the plurality of attenuator value setting conditions;

a marker level acquiring section which acquires a waveform level on the set position of the marker to be measured, which is specified by the marker specifying section from the plurality of markers set on the measurement waveform on the screen of the display by the marker setting section, from the waveform data stored in the waveform memory;

a level comparing section which determines whether or not the waveform level on the set position of the marker to be measured acquired by the marker level acquiring section falls within the effective measurement level range stored in the attenuator value setting condition memory section and corresponding to the set position of the marker to be measured;

an attenuator value change determining section which determines a change in the attenuator value setting conditions when the level comparing section determines that the waveform level of the set position of the marker to be measured does not fall within the effective measurement level range which is stored in the attenuator value setting condition memory section and corresponds to the marker to be measured;

an attenuator value setting condition changing section which changes the attenuator value setting condition stored in the attenuator value setting condition memory section into new attenuator value setting conditions where the waveform level on the set position of the marker to be measured acquired by the marker level acquiring section falls within the effective measurement level range upon the determination of the change in the attenuator value change determining section;

an attenuator value setting section which sets unchanged attenuator value setting conditions stored in the attenuator value setting condition memory section or changed new attenuator value setting conditions correspondingly with the marker to be measured, in the equivalent attenuator; and a control section comprising a CPU which controls the measured optical fiber to be measured based on the attenuator value setting conditions set in the equivalent attenuator by the attenuator value setting section correspondingly with the marker to be measured, reads the waveform data stored in the waveform memory correspondingly with the marker to be measured, and successively displays the waveform data on the screen of the display so as to enable real-time measurement in which the measurement waveform displayed on the screen of the display is successively updated; and a waveform synthesizing section which reads the waveform data corresponding to the marker to be measured acquired by the measurement based on the attenuator value setting conditions set in the equivalent attenuator by the attenuator value setting section correspondingly with the marker to be measured and synthesizes the waveform data so as to display the synthesized waveform data on the screen of the display, wherein the attenuator value setting conditions set in the equivalent attenuator are sequentially set to optimum values correspondingly with the plurality of markers based on a result of determining whether or not the waveform levels of the markers set on the screen of the display by the marker setting section fall within the preset effective measurement level ranges, and the measured optical fiber is repeatedly measured, so that waveforms on desired positions can be measured over a predetermined range with a S/N ratio of not less than the predetermined value based on the measurement waveform of the synthesized waveform data displayed on the screen of the display, and reflection attenuation having a predetermined level difference of the measurement waveform can be measured by automatically tracking a level fluctuation due to a change in a state of the measured optical fiber, and wherein operations of the sections comprising the optical time domain reflectometer are performed under control of the CPU.

16. A method for testing optical fiber using an optical pulse, the method comprising:

a step of emitting an optical pulse to be incident on a measured optical fiber;

a step of receiving backscattered light returned from the measured optical fiber so as to convert the backscattered light into an electric signal;

a step of amplifying the electric signal with a predetermined gain by an amplifying section;

a step of adding output signals amplified by the amplifying section a predetermined number of times by a signal-averaged processing section which comprises an equivalent attenuator together with the amplifying section so as to average the output signals having been added and output an averaged output signal;

a step of logarithmically converting the averaged output signal from the equivalent attenuator by a logarithmic converting section;

a step of storing the output signal from the logarithmic converting section as waveform data in a waveform memory;

a step of reading the waveform data stored in the waveform memory so as to display the waveform data as a measurement waveform on a screen of a display;

a step of setting markers arbitrarily on the measurement waveform displayed on the screen of the display movably;

a step of specifying a marker to be measured from the plurality of markers when the plurality of markers are arbitrarily set on the measurement waveform displayed on the screen of the display;

a step of storing a plurality of attenuator value setting conditions for real-time measurement which are preset correspondingly with set positions of the markers set on the measurement waveform on the screen of the display and which comprise combinations of a gain of the amplifying section and a number of adding times in the signal-averaged processing section which comprise the equivalent attenuator, and effective measurement level ranges which are preset for the plurality of attenuator value setting conditions, in an attenuator value setting condition memory section;

a step of acquiring a waveform level corresponding to a set position of the marker to be measured in the plurality of markers set on the measurement waveform on the screen of the display from the waveform data stored in the waveform memory;

a step of determining whether or not the waveform level on the set position of the marker to be measured falls within the effective measurement level range stored in the attenuator value setting condition memory section and corresponding to the marker to be measured;

a step of, when the determination is made that the waveform level on the set position of the marker to be measured does not fall within the effective measurement level range corresponding to the marker to be measured stored in the attenuator value setting condition memory section, determining a change in the attenuator value setting conditions;

a step of changing the attenuator value setting conditions stored in the attenuator value setting condition memory section into new attenuator value setting conditions where waveform levels on the set position of the marker to be measured falls within the effective measurement level range upon the determination of the change in the attenuator value setting conditions;

a step of setting unchanged attenuator value setting conditions stored in the attenuator value setting condition memory section or changed new attenuator value setting conditions in the equivalent attenuator correspondingly with the marker to be measured;

a step of allowing the measured optical fiber to be measured based on the attenuator value setting conditions set in the equivalent attenuator correspondingly with the marker to be measured, and the waveform data stored in the waveform memory correspondingly with the marker to be measured is read and is successively displayed on the screen of the display so that the real-time measurement in which the measurement waveform displayed on the screen of the display is successively updated is enabled; and a step of reading the waveform data corresponding to the marker to be measured acquired by the measurement based on the attenuator value setting conditions set in the equivalent attenuator by the attenuator value setting section correspondingly to the marker to be measured from the waveform memory and synthesizing the waveform data so as to display the synthesized waveform data on the screen of the display;

wherein the attenuator value setting condition memory section has stored therein a plurality of attenuator value setting conditions for the real-time measurement which are preset correspondingly with the set positions of the plurality of markers set on the measurement waveform on the screen of the display and which comprise the combinations of a gain of the amplifying section and a number of adding times in the signal-averaged processing section which comprise the equivalent attenuator, and effective measurement level ranges which are preset for the plurality of attenuator value setting conditions, and wherein the attenuator value setting conditions set in the equivalent attenuator are sequentially set to optimum values correspondingly with the plurality of markers based on a result of determining whether or not waveform levels of the markers displayed on the screen of the display fall within the preset effective measurement level ranges, and the measured optical fiber is repeatedly measured, so that waveforms on desired positions can be observed over a predetermined range with a S/N ratio of not less than the predetermined value based on the measurement waveform of the synthesized waveform data displayed on the screen of the display, and reflection attenuation having a predetermined level difference of the measurement waveform can be measured by automatically tracking a level fluctuation due to a change in a state of the measured optical fiber.

* * * * *